United States Patent
Artelsmair et al.

(10) Patent No.: US 12,090,582 B2
(45) Date of Patent: Sep. 17, 2024

(54) METHOD FOR COMPENSATING AN INTERFERING INFLUENCE ON A WELDING CURRENT FROM ANOTHER WELDING POWER SOURCE

(71) Applicant: Fronius International GmbH, Pettenbach (AT)

(72) Inventors: Josef Artelsmair, Pettenbach (AT); Dominik Soellinger, Pettenbach (AT); Michael Muss, Pettenbach (AT)

(73) Assignee: Fronius International GmbH, Pettenbach (AT)

( * ) Notice: Subject to any disclaimer, the term of this patent is extended or adjusted under 35 U.S.C. 154(b) by 760 days.

(21) Appl. No.: 17/268,543

(22) PCT Filed: Aug. 2, 2019

(86) PCT No.: PCT/EP2019/070866
§ 371 (c)(1),
(2) Date: Feb. 15, 2021

(87) PCT Pub. No.: WO2020/043428
PCT Pub. Date: Mar. 5, 2020

(65) Prior Publication Data
US 2021/0308781 A1  Oct. 7, 2021

(30) Foreign Application Priority Data
Aug. 30, 2018 (EP) .................... 18191800

(51) Int. Cl.
*B23K 9/095* (2006.01)
*B23K 9/10* (2006.01)
(52) U.S. Cl.
CPC .......... *B23K 9/0953* (2013.01); *B23K 9/1012* (2013.01)

(58) Field of Classification Search
CPC ... B23K 9/0953; B23K 9/1012; B23K 9/1735
See application file for complete search history.

(56) References Cited

U.S. PATENT DOCUMENTS

| 5,043,557 A | 8/1991 | Tabata et al. |
| 6,359,258 B1 | 3/2002 | Blankenship et al. |
| (Continued) | | |

FOREIGN PATENT DOCUMENTS

| CN | 104209630 A | 12/2014 |
| CN | 104227179 A | 12/2014 |
| (Continued) | | |

OTHER PUBLICATIONS

International Search Report corresponding to International application No. PCT/EP2019/070866, mailed Nov. 7, 2019 (12 pages).

(Continued)

*Primary Examiner* — Brian W Jennison
*Assistant Examiner* — Kristina J Babinski
(74) *Attorney, Agent, or Firm* — Maginot, Moore & Beck, LLP

(57) ABSTRACT

Method for compensating an interfering influence on a welding current, provided by a welding power source (4) for welding a workpiece (3), from another welding power source (4'), comprising the steps of:
(a) providing (SA) a compensation voltage ($U_{Komp}$), which is calculated on the basis of a welding current progression provided by the other welding power source (4');
(b) subtracting (SB) the compensation voltage ($U_{Komp}$) from a measured voltage ($U_{Mess}$), measured by a voltage measurement unit (8) of the welding power source (4), so as to determine a corrected measured voltage ($U'_{Mess}$); and (Continued)

(c) regulating (SC) the welding current generated by the welding power source (4) as a function of the corrected measured voltage ($U'_{Mess}$).

14 Claims, 13 Drawing Sheets

(56) References Cited

U.S. PATENT DOCUMENTS

| | | | |
|---|---|---|---|
| 6,710,297 B1 | 3/2004 | Artelsmair et al. | |
| 7,932,685 B2* | 4/2011 | Arimura | H02M 3/1582 |
| | | | 318/400.1 |
| 9,623,507 B2* | 4/2017 | Shigeyoshi | B23K 9/0956 |
| 2008/0245781 A1 | 10/2008 | Wilhelm | |
| 2010/0308027 A1* | 12/2010 | Vogel | B23K 9/0953 |
| | | | 219/130.21 |
| 2018/0050410 A1* | 2/2018 | Mehn | B23K 9/0953 |

FOREIGN PATENT DOCUMENTS

| | | |
|---|---|---|
| CN | 104245210 A | 12/2014 |
| CN | 104339068 A | 2/2015 |
| DE | 10 2007 016 103 A1 | 10/2008 |
| EP | 1 977 847 A1 | 10/2008 |
| JP | S52-85040 A | 7/1977 |
| JP | H07-115183 B2 | 12/1995 |
| JP | 2001-518603 A | 10/2001 |
| JP | 2007-83268 A | 4/2007 |
| JP | 2011-629 A | 1/2011 |
| JP | 2015-9271 A | 1/2015 |
| JP | 2015-76988 A | 4/2015 |
| WO | 0074888 A1 | 12/2000 |

OTHER PUBLICATIONS

Chinese Office Action and Search Report corresponding to Chinese Patent Application No. 201980056392.4, mailed May 7, 2022 (9 pages).

Chinese Office Action and Search Report corresponding to Chinese Patent Application No. 201980056208.6, mailed May 12, 2022 (8 pages).

* cited by examiner

METHOD FOR COMPENSATING AN INTERFERING INFLUENCE ON A WELDING CURRENT FROM ANOTHER WELDING POWER SOURCE

PRIORITY CLAIM

This application is a 35 U.S.C. 371 National Stage application of PCT/EP2019/070866, filed Aug. 2, 2019, and claims priority to European Application No. EP 18191800.4 filed on Aug. 30, 2018. The entire contents of the above-mentioned patent applications are incorporated herein by reference as part of the disclosure of this U.S. application.

TECHNICAL FIELD

The invention relates to a method for determining interfering coupling between welding circuits of a welding system and to a method for compensating this interfering coupling.

BACKGROUND

A welding system may comprise one or more welding circuits which can be used for welding at least one workpiece. Each of the welding circuits has a welding power source which provides a welding current for welding the workpiece. The welding power sources supply current to a meltable welding wire electrode in the welding circuit, an arc being produced between the tip of the welding wire electrode and the surface of the workpiece. The welding wire electrode is melted by the arc in a different manner depending on the welding method variant and the welding parameters used.

During pulsed arc welding, an increased pulse voltage is regularly superposed on a base voltage, causing alternation between a base current and a pulse current with a predetermined frequency and pulse time.

FIG. 1 shows the schematic current progression over time t in a pulsed welding process. As can be seen in FIG. 1, in this welding process the welding current I is raised to high values in a pulsed shape. The transport of material into the melting bath is based on the current pulses. During the base current phase, the arc burns with a low power, the additional material or the welding wire electrode being melted and the welding bath being kept liquid. During the pulse phase, a drop is formed, which is released by magnetic constriction. In pulsed arc welding, the introduction of heat into the workpiece can be reduced and controlled. As a result, thin workpiece sheets can be welded using relatively thick welding wire electrodes, the melting power being higher and it being possible greatly to reduce splashes during the welding process.

The progression of the welding current level in FIG. 1 shows a base current amplitude $I_g$ and a pulse current amplitude $I_p$ for a current pulse having a pulse duration $t_p$. The current pulses are applied at a pulse frequency f in accordance with a period duration T. FIG. 1 further shows a welding current average $I_{av}$.

FIG. 2 shows a period of a pulsed welding process. The arc initially ($t_1$) burns at a low base current level. As the current increases ($t_2$), the wire end of the welding wire electrode is initially melted. Once the current has reached ($t_3$) the pulse current value $I_p$, the wire end of the welding wire electrode is melted intensely and a drop forms. This drop is constricted by the magnetic pinching-off effect. The current is subsequently reduced ($t_4$) to a lower current value, the formed drop being constricted further and accelerated in the direction of the melting bath. At time $t_5$, the drop has been released from the wire end of the welding wire electrode. The welding current I is subsequently reduced ($t_6$) to the base current value again, as can be seen in FIG. 2.

FIG. 3 shows a conventional welding circuit SSK of a welding system. The welding circuit SSK comprises all the lines and connections from a positive pole to a negative pole of the welding power source SSQ. The welding circuit SSK is flowed through by a welding current I. The forward and reverse conduction of the welding circuit SSK are each affected by a resistance R and an inductance L, as is schematically shown in FIG. 3. The welding circuit resistance R is formed by the sum of all resistances of all lines and connections flowed through by the welding current I. The welding circuit resistance R can be subdivided into the following sub-resistances: a resistance of the earth line RL−, a resistance of the line RL+ passing through the cable assembly, and transition resistances at the terminal connections. The resistances of the welding lines, in other words the resistance of the earth line and the resistance of the line passing through the cable assembly, are determined by the cross section of the line and by the conductor material, and do not vary under normal circumstances. By contrast, the transition resistance of the terminal connections can vary relatively heavily, for example as a result of oxidation or loose terminal connections.

The welding circuit inductance L of the welding circuit SSK is understood to be the property whereby the welding circuit counteracts each change in current with a dynamic resistance. The greater the welding circuit inductance of the welding circuit SSK, the greater this dynamic resistance becomes.

Both the welding circuit resistance R and the welding circuit inductance L of the welding circuit SSK have effects on the welding process. For example, if the welding circuit resistance R changes, the arc length changes.

Further, a change in the welding circuit inductance L has effects on the welding process, as is shown in FIG. 4. FIG. 4 shows a voltage progression at the arc LB and at the output jacks of the welding power source and a progression of the welding current I over time during a period of a pulsed welding process. In a welding method, various modulation types can be used, in particular Ig/Ip modulation and Ig/Up modulation. In Ig/Ip modulation, the welding current I exactly corresponds to the predetermined welding current target value at each time within a period. If the current increases from the base current to the pulsed current, the necessary voltage required for driving the current across the welding circuit inductance L therefore sets in automatically. This has the advantage over Ig/Up modulation that the welding circuit inductance L does not influence the rise in current. By contrast, in Ig/Up modulation, the rise in current varies with the welding circuit inductance L of the welding circuit SSK, since the pulsed voltage of this modulation is kept constant. In Ig/Ip modulation, however, the rate of the rise in current can only be kept constant if sufficient voltage is supplied by the welding power source SSQ of the welding circuit SSK. However, this threshold is met if the sum of the individual voltages in the welding circuit SSK exceeds the maximum output voltage of the welding power source SSQ. The rise in welding current is slower in this case and alters the welding process.

FIG. 5 schematically shows the composition of the voltage in a conventional welding circuit SSK. The voltage $U_a$, in other words the voltage at the output terminals of the power source, is composed of the sub-voltages $U_{sk}$, $U_L$ and $U_{puls}$, where $U_{sk}=I_p \cdot R_{sk}$, $U_L=L \cdot di/dt$ and $U_{puls}$ is independent of the shielding gas used, the material and the arc length.

The voltage $U_{sk}$ is independent of the welding circuit resistance R and the pulse current $I_p$.

The voltage $U_L$ is dependent on the inductance L and the rate of change of current di/dt.

If a plurality of welding power sources SSQ are used in a welding system, as is schematically shown in FIG. 6, coupling between the welding circuits SSK occurs. The current lines of a welding power source SSQ form a conductor loop which encloses a particular area. Whenever two fields or areas of this type overlap, if there is a change in the current I in one conductor loop a voltage U is induced in the second conductor loop. The more the two areas or fields overlap and the smaller the distance between the two fields or loops, the greater the induced current U. The various welding currents SSK of the welding system behave somewhat like transformers with poor coupling.

The coupling between the welding currents SSK of the welding system has effects on the process behaviour during welding. For each current pulse applied to a welding circuit SSK, a voltage U is induced in a line of the other welding circuit SSK. This takes place in both directions, or bidirectionally. The voltage U induced in the welding circuit SSK brings about a flow of current in the other welding power source, the effect of said flow acting like a change in resistance in the arc LB. In the welding circuit SSK, an additional voltage source is switched on to some extent, and is controlled by the other welding power source SSQ, as is shown schematically in FIG. 6. Since the two welding power sources SSQ do not operate synchronously, and in particular have different pulse frequencies, beats or fluctuations in the arc length may occur. This makes itself most noticeable at small frequency differences in the pulse frequencies.

So as to keep a mutual influence between welding circuits SSK of a welding system small, it is conventionally attempted to minimise each induction area by way of tight, parallel laying of the lines of the welding circuit SSK. Further, it is conventionally attempted to separate the welding circuits SSK spatially.

However, in many cases this conventional procedure cannot be carried out in practice, since appropriate laying of the lines of the different welding circuits SSK of the welding system is not possible as a result of the prevailing production conditions. In addition, in many cases there is neither the knowledge nor the awareness to lay the lines of the welding circuits SSK appropriately. Moreover, even if the lines of the welding circuits SSK are laid appropriately, it is scarcely possible to estimate to what extent this has reduced the coupling between the welding circuits SSK and to what extent the remaining residual coupling will still negatively influence the welding process on the workpiece WS. Therefore, there is a need is to provide a method for compensating an interfering influence on a welding current, provided by a welding power source for welding a workpiece, from another welding power source.

SUMMARY OF THE INVENTION

The invention accordingly provides a method for compensating an interfering influence on a welding current, provided by a welding power source (receiving welding power source) for welding a workpiece, from another welding power source (transmitting welding power source), this compensation method comprising the following steps:

providing a compensation voltage, which is calculated on the basis of a welding current progression provided by the other welding power source (transmitting welding power source), subtracting the compensation voltage from a measured voltage, measured by a voltage measurement unit of the welding power source (receiving welding power source), so as to determine a corrected measured voltage, and regulating the welding current generated by the welding power source (receiving welding power source) as a function of the corrected measured voltage.

In one possible embodiment of the compensation method according to the invention for compensating an interfering influence on a welding current, provided by a welding power source for welding a workpiece, from another welding power source (transmitting welding power source) used for welding the same or a different workpiece, the compensation voltage is calculated on the basis of a current profile of the welding current progression provided by the other welding power source (transmitting welding power source) and on the basis of stored coupling factors.

In a further possible embodiment of the compensation method according to the invention, the stored coupling factors include an ohmic coupling factor and at least one inductive coupling factor.

In a further possible embodiment of the compensation method according to the invention, the current profile of the welding current progression of the other welding power source (transmitting welding power source) is read out from a current profile store or data store of the welding power source (receiving welding power source).

For this purpose, there is preferably an appropriate synchronisation of the current progression of the transmitting welding power source with the current progression data stored in the receiving welding power source.

In a further possible embodiment of the compensation method according to the invention, the current profile of the welding current progression of the other welding power source (transmitting welding power source) is transmitted in a wireless or wired manner from the other welding power source (transmitting welding power source) to the computation unit of the welding power source (receiving welding power source).

In a further possible embodiment of the compensation method according to the invention, the current profile of the welding current progression of the other welding power source (transmitting welding power source) comprises current levels and changes in current level along with associated time values.

In a further possible embodiment of the compensation method according to the invention, the compensation voltage calculated by a computation unit of the welding power source (receiving welding power source) is continuously subtracted, by a compensation unit of the welding power source (receiving welding power source), from the measured voltage measured by the voltage measurement unit of the welding power source (receiving welding power source) so as to determine the corrected measured voltage.

In a further possible embodiment of the compensation method according to the invention, the welding current which is regulated by the regulation unit using the corrected measured voltage is supplied via a welding current line of the welding power source (receiving welding power source) to a welding torch for welding the workpiece.

In a further aspect, the invention provides a welding power source for generating a welding current which can be supplied via a welding current line to a welding torch for welding a workpiece, the welding power source having:
- a computation unit, suitable for calculating a compensation voltage as a function of a welding current progression of another welding power source used for welding the same or a different workpiece, and
- a compensation unit, suitable for subtracting the compensation voltage calculated by the computation unit from a measured voltage, measured by a voltage measurement unit of the welding power source, so as to determine a corrected measured voltage, which is used by a regulation unit of the welding power source to regulate the welding current generated by the welding power source.

In one possible embodiment of the welding power source according to the invention, the computation unit of the welding power source calculates the compensation voltage on the basis of a current profile of the welding current provided by the other welding power source (transmitting welding power source) and on the basis of coupling factors stored in a data store or a database.

In a further possible embodiment of the welding power source according to the invention, the current profile of the welding current of the other welding power source (transmitting welding power source) comprises current levels and changes in current level along with associated time values.

In a further possible embodiment of the welding power source according to the invention, a current profile of the welding current of the other welding power source is received from the other welding power source (transmitting welding power source) or read out in a synchronised manner from a current profile store of the welding power source.

In a further possible embodiment of the welding power source according to the invention, the computation unit of the welding power source, provided for calculating the compensation voltage, has:
- a first multiplier, which multiplies a present current level within the current profile by an ohmic coupling factor so as to calculate an ohmic portion of the compensation voltage,
- a second multiplier, which multiplies a present change in current level within the current profile by an inductive coupling factor so as to calculate an inductive portion of the compensation voltage, and
- an adder, which adds the ohmic portion of the compensation voltage and the inductive portion of the compensation voltage to calculate the compensation voltage.

The invention further provides a welding system comprising at least two welding power sources, which are jointly operated for welding one or more workpieces,
- each of the welding power sources being provided for generating a welding current which can be supplied via a welding current line to a welding torch for welding one or the plurality of workpieces, each of the welding power sources having:
- a computation unit, suitable for calculating a compensation voltage as a function of a welding current progression of another welding power source of the welding system, and
- a compensation unit, suitable for subtracting the compensation voltage calculated by the computation unit from a measured voltage, measured by a voltage measurement unit of the welding power source, so as to determine a corrected measured voltage, which is used by a regulation unit of the welding power source to regulate the welding current generated by this welding power source.

BRIEF DESCRIPTION OF FIGURES

Hereinafter, possible embodiments of the various aspects of the invention are described in greater detail with reference to the accompanying drawings, in which.

DETAILED DESCRIPTION OF EMBODIMENTS

The method or device according to the invention serves to reduce or eliminate a mutual influence between welding power sources which are operated simultaneously in a welding system. For this purpose, in a first aspect of the invention, initially the existing interfering coupling between the welding circuits of the welding system is determined. In a further aspect of the invention, the determined interference is subsequently compensated.

Figure 1:
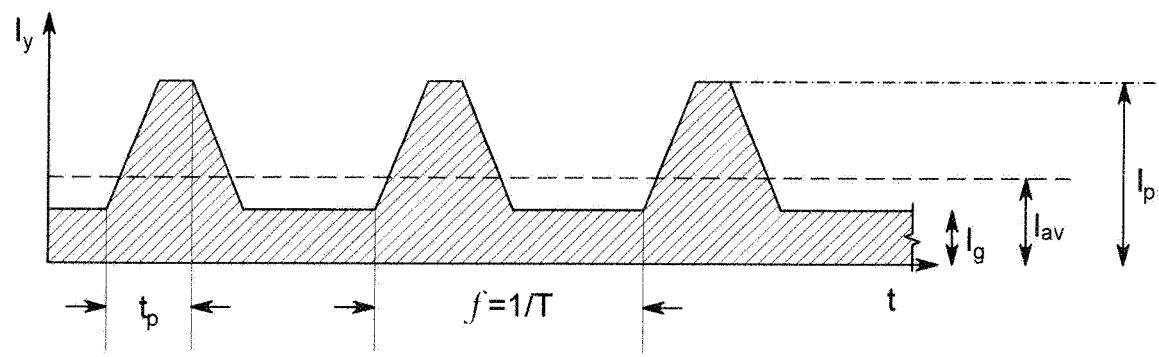
FIG. 1 shows a current progression in a conventional pulsed welding process.
Figure 2:
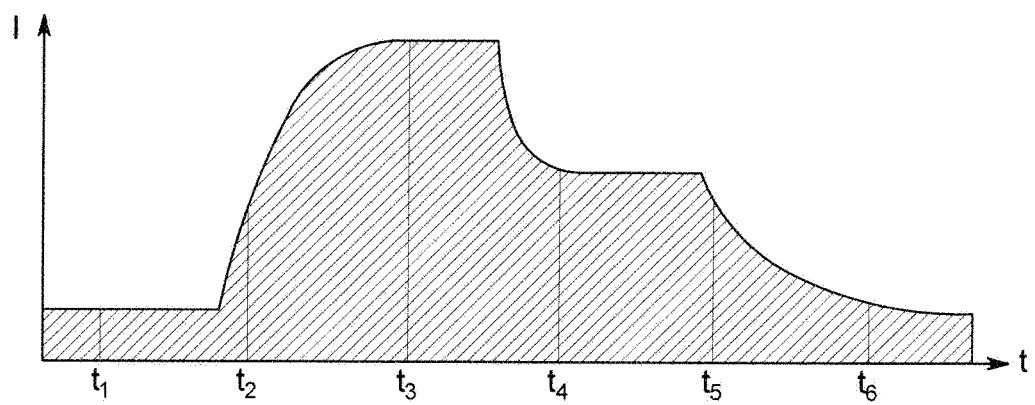
FIG. 2 shows the current progression during a period of the pulsed welding process shown in FIG. 1.
Figure 3:
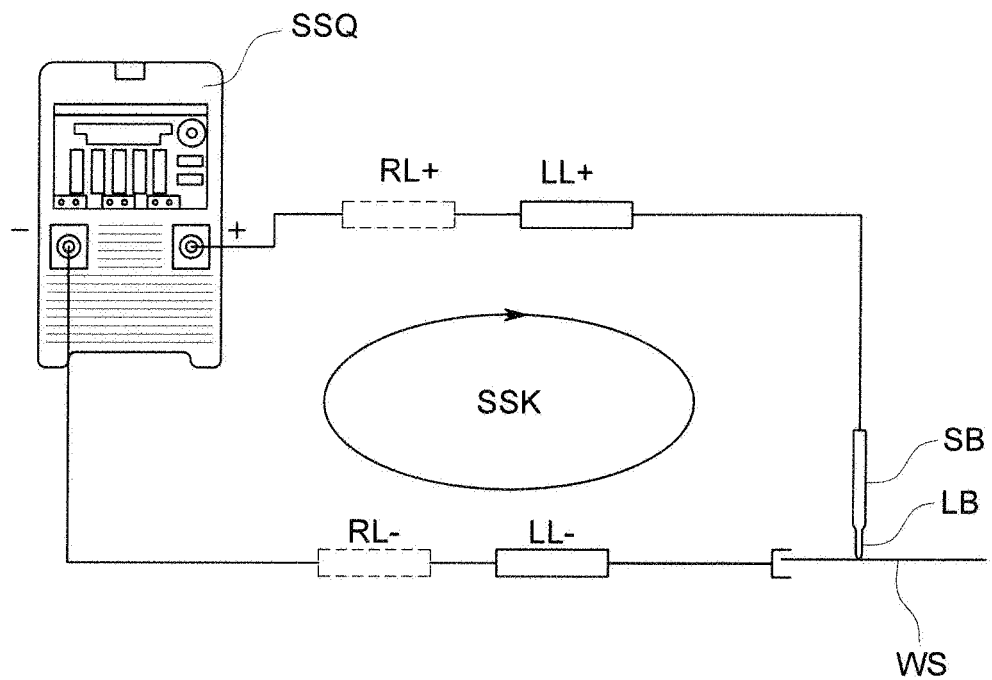
FIG. 3 is a schematic drawing of a conventional welding circuit.
Figure 4:
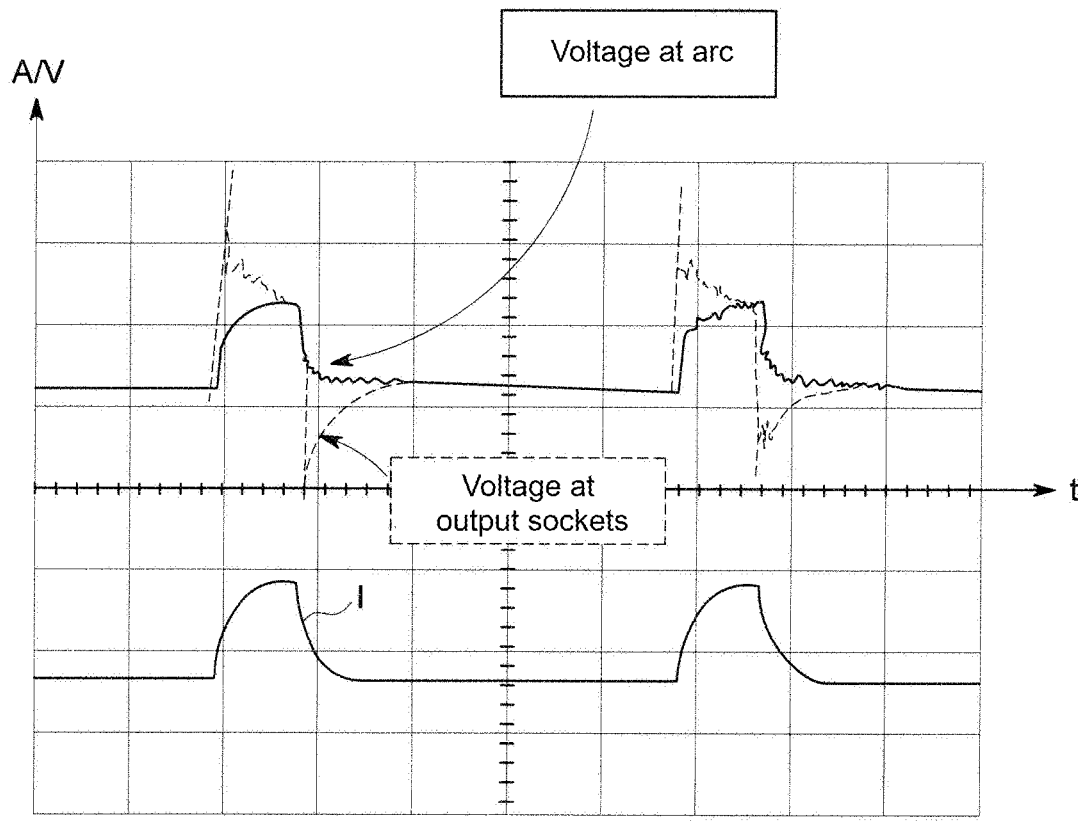
FIG. 4 shows a voltage progression and current progression of a period of a conventional pulsed welding process.
Figure 5:
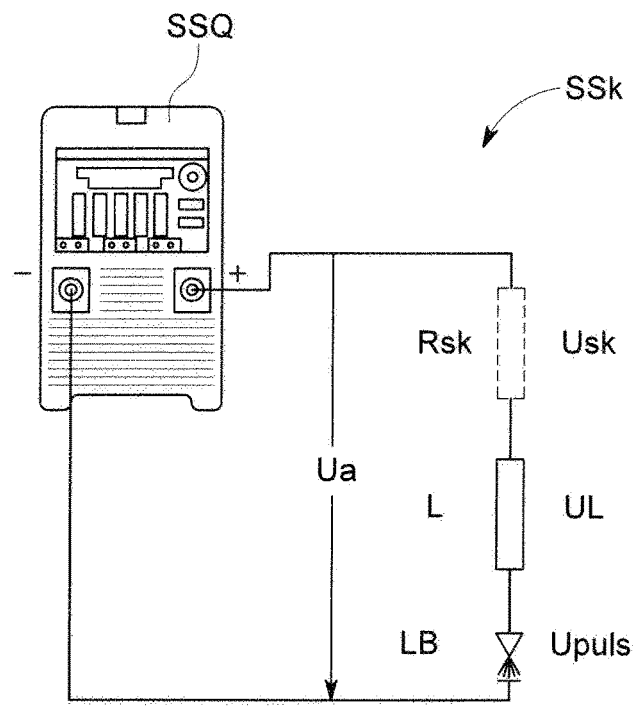
FIG. 5 is a schematic drawing illustrating the composition of the voltage in a conventional welding circuit.
Figure 6:
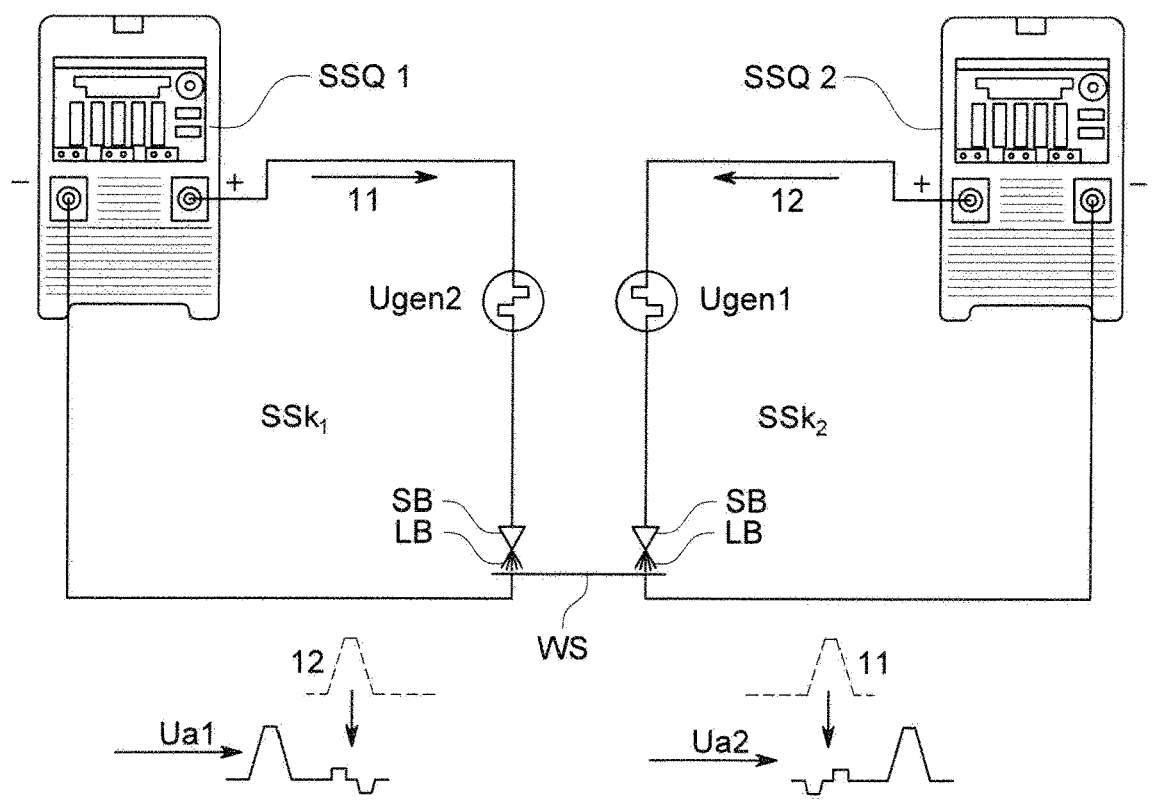
FIG. 6 is a schematic drawing of a coupling between different welding circuits, illustrating a technical problem underlying the present invention.
Figure 7:
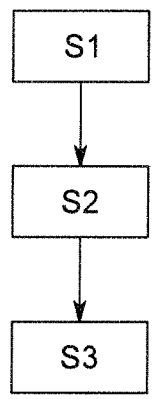
FIG. 7 is a simple flow chart showing an embodiment of a method for determining an interfering coupling between welding circuits of a welding system in accordance with a first aspect of the invention.

FIG. 7 is a flow chart illustrating an embodiment of a method for determining an interfering coupling between welding circuits 2-1, 2-2 of a welding system 1 in accordance with a first aspect of the present invention. A welding system 1 of this type is shown by way of example in FIG. 8.

In the embodiment shown in FIG. 7, the method according to the invention for determining an interfering coupling between welding circuits 2-1, 2-2 of a welding system 1 substantially comprises three steps.

In a first step S1, a predetermined current profile is applied in a first welding circuit 2-1 (transmitting welding circuit) of the welding system 1.

In a further step S2, a voltage progression U(t) and/or current progression I(t) which are thus induced in a second welding circuit 2-2 (receiving welding circuit) of the welding system 1 is detected.

Finally, in a step S3, the interfering coupling between the welding circuits 2-1, 2-2, in other words between the transmitting and receiving welding circuits, is determined on the basis of the current profile SP of the current applied in the first welding circuit 2-1 (transmitting welding circuit) and of the voltage progression and/or current progression detected in the second welding circuit 2-2 (receiving welding circuit).

FIG. 8 shows by way of example a welding system 1 comprising two welding circuits 2-1, 2-2 which are used for simultaneously welding a workpiece 3. The two welding circuits 2-1, 2-2 each include a welding power source 4-1, 4-2, as shown in FIG. 8. A current I can be supplied to the workpiece 3 via a supply line 5-1, 5-2 in each case. Further, the current I in each welding circuit 2-1, 2-2 is returned, in each case via an associated return line or earth line 6-1, 6-2, to the welding power source 4-1, 4-2 of the associated welding circuit 2-1, 2-2, as shown in FIG. 8. The supply line 5-$i$ and the drain line 6-$i$ of a welding circuit 2-1 are each connected to a pole 12$a$, 12$b$ of the welding power source 4-$i$ of the welding circuit 2-1.

Figure 10:
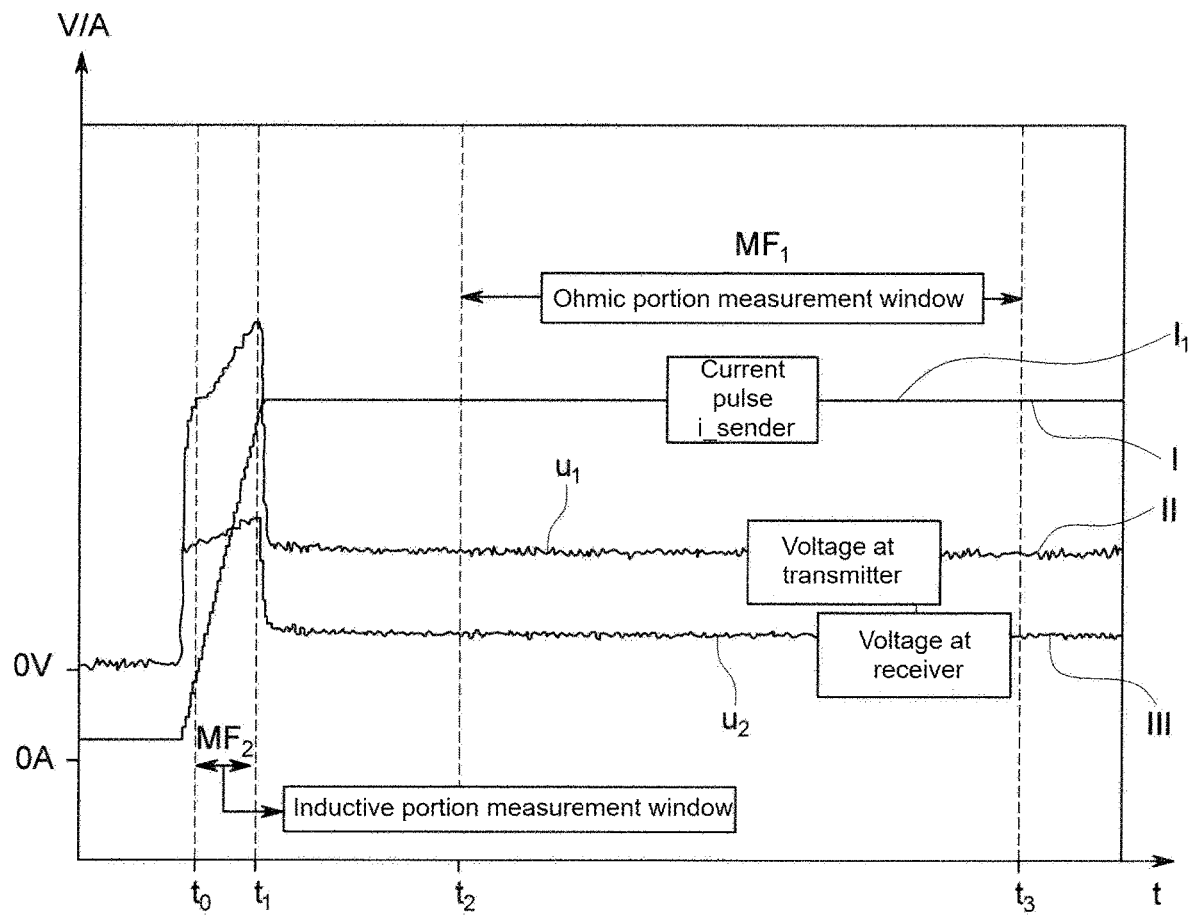
FIG. 10 shows signal progressions illustrating a possible embodiment of the method according to the invention, shown in FIG. 7, for determining an interfering coupling between the welding circuits of the welding system.

The two welding circuits 2-1, 2-2 of the welding system 1 are preferably closed for determining an interfering coupling between the welding circuits, as shown in FIG. 8. The circuitry arrangement shown in FIG. 8 is suitable for determining an interfering coupling between the welding circuit 2-1 of the welding system 1 and the second welding circuit 2-2 of the welding system 1. For this purpose, in a first step S1, initially a predetermined current profile SP is applied in one of the two welding circuits of the welding system 1, for example in the first welding circuit 2-1, as shown schematically in FIG. 8. The current profile SP applied in the first welding circuit 2-1 preferably has one or more current pulses. In the welding power source 4-2 of the other welding circuit 2-2, an induced voltage progression U is detected and stored, as shown schematically in FIG. 8. The voltage progression and/or current progression induced in the second welding circuit 2-2 of the welding system 1 are thus detected in step S2 and preferably stored. Subsequently, in the welding power source 4-2, by way of a preferably integrated computation unit 7-2, the interfering coupling between the welding circuits 2-1, 2-2 is determined or calculated on the basis of the current profile SP of the current I applied in the first welding circuit 2-1 and of the voltage progression U and/or current progression detected in the second welding circuit 2-2 by means of a detector unit or measurement unit 8-2. In this context, an ohmic portion of the coupling between the welding circuits 2-$i$ and an inductive portion of the coupling between the welding circuits 2-$i$ of the welding system 1 are determined or calculated. In a preferred embodiment, the ohmic portion of the coupling between the welding circuits 2-$i$ of the welding system 1 is determined in at least one first measurement window MF1 and the inductive portion of the coupling between the welding circuits 2-$i$ of the welding system 1 is determined in at least one second measurement window MF2. The first measurement window MF1 for determining the ohmic portion of the coupling is situated within a phase of the current profile SP applied in the first welding circuit 2-1 where the current level of the applied current I is constant, as is also shown in FIG. 10. The second measurement window MF2 for determining the inductive portion of the coupling between the welding circuits 2-$i$ is preferably situated in a phase of the current profile applied in the first welding circuit 2-1 where the current level of the applied current is rising during a rising flank of a current pulse or falling during a falling flank of a current pulse. FIG. 10 shows a measurement window MF2 for determining the inductive portion of the coupling during a rising flank of a current pulse. The inductive portion of the measured voltage $U_2$ is preferably calculated by determining the voltage-time area at the receiving welding power source 4-2 during a change in current at the transmitting welding power source 4-1 and subtracting the ohmic voltage portion therefrom. Preferably, an average voltage of the inductive portion of the coupling and of the ohmic portion are calculated and evaluated separately from one another. Preferably, coupling factors $K_R$, $K_L$ are calculated which indicate the ohmic portion of the coupling and the inductive portion of the coupling between the welding circuits 2-1, 2-2 of the welding system 1. In one possible embodiment, the calculated ohmic coupling factor $K_R$, which indicates the ohmic portion of the coupling between the welding circuits 2-$i$, and the calculated inductive coupling factor $K_L$, which indicates the inductive portion of the coupling between the welding circuits 2-$i$, are stored in data stores 9-1, 9-2 of the welding power sources 4-1, 4-2 of the welding system 1. In one possible embodiment, the calculated ohmic coupling factor $K_R$ and the calculated inductive coupling factor $K_L$ are outputted to a user of the welding system 1 via a user interface.

The ohmic portion of the coupling, which is reflected in the ohmic coupling factor $K_R$, indicates whether there are line portions in the two welding circuits 2-1, 2-2 which are being flowed through by the electric current of both power sources 4-1, 4-2. The ohmic portion $R_{Koppel}$ of the coupling is preferably indicated in milliohms.

$$R_{Koppel} = U_{Empfänger}/I_{Sender},$$

where $R_{Koppel}$ is the resistance of the shared line portions of the two welding circuits 2-1, 2-2, $U_{Empfänger}$ is the voltage detected on the receiving side by the receiving welding power source 4-2, and $I_{Sender}$ is the current $I_1$ applied in the transmitting welding circuit 2-1.

Shared line portions in the two welding circuits 2-1, 2-2 are to be avoided; in other words, it is attempted to keep the ohmic portion of the coupling as low as possible.

The inductive portion of the coupling between the two welding circuits 2-1, 2-2 reflects the spatial arrangement of the two welding circuits relative to one another, in particular the distance between the two welding circuits, and is indicated in millihenries.

$$L_{kopp} = U_{empf\text{-}ind}/(di/dt_{sender}),$$

where $L_{kopp}$ represents the coupling inductance, $U_{empf\_ind}$ is the voltage $U_2$ induced at the receiving welding circuit 2-2, and $di/dt_{sender}$ represents the change in the current $I_1$ made at the transmitting welding circuit 2-1.

The determined values of the coupling measurement, in other words the inductive and the ohmic portion of the coupling between the welding circuits 2-$i$, are preferably calculated by a computation unit 7-$i$ and, in one possible embodiment, outputted to a user of the welding system 1 via a user interface. In one possible embodiment, the calculated coupling inductance $L_{Koppel}$ is related to the inductance L1 of the transmitting welding circuit 2-1 and may for example be displayed to the user as a percentage. This has the advantage that the display via the user display is more easily comprehensible, since the unit of millihenries is relatively difficult for users to understand and in addition can easily be confused with the normal welding circuit inductance of the welding circuit. A relative coupling inductance ($l_{Koppel}=L_{Koppel}/L$) indicated in percent is intuitively easier to understand, the ideal value for the relative coupling inductance $l_{Koppel}$ being 0%, in other words no coupling between the welding circuits 2-$i$.

In one possible embodiment, the ohmic portion of the coupling $R_{Koppel}$ may also be related to the transmitter welding circuit 2-1 ($r_{Koppel}=R_{Koppel}/R$). A value of $r_{Koppel}>0\%$ for the relative ohmic portion $r_{Koppel}$ indicates that there is a shared line portion between the two welding circuits 2-1, 2-2 which is being flowed through by both currents I1, I2. This is to be avoided. Therefore, a value of 0% for the relative ohmic portion of the coupling $r_{Koppel}$ should be aimed for.

In one possible embodiment of the welding system 1, there is a wireless or wired communication connection KV between the welding power source 4-1 of the first welding circuit 2-1 and the welding power source 4-2 of the second welding circuit 2-2. In this embodiment, the provided current profile SP applied in the first welding circuit 2-1 by the first welding power source 4-1 of the welding system 1 is transmitted to the welding power source 4-2 via the communication connection KV. In the second welding circuit 2-2, an induced voltage progression and/or current progression thus caused is detected. In a further step, the interfering coupling between the two welding circuits 2-1, 2-2 can subsequently be determined or calculated by a computation unit 7 on the basis of the current profile SP, conveyed or transmitted via the communication connection KV, of the current I applied in the first welding circuit 2-1 and of the voltage progression and/or current progression detected in the second welding circuit 2-2.

In an alternative embodiment, there is no communication connection KV, and no data exchange takes place between the two welding power sources 4-1, 4-2 of the two welding circuits 2-1, 2-2 of the welding system 1. The calculation of the coupling factors KF or the determination of the interfering coupling between the welding circuits 2-$i$ can take place even without a data connection between the two welding power sources 4-1, 4-2. In this embodiment, the necessary data are already stored in a data store 9-2 of the receiving welding power source 4-2. In this variant configuration, the current profile SP (di/dt/current level and time values) stored in the transmitting welding power source 4-1 in a data store 9-1 is also stored in the data store 9-2 of the receiving welding power source 4-2. As a result, it is possible for the computation unit 7-2 present in the receiving welding power source 4-2 to be able to perform the calculation of the inductive coupling factor $K_L$ and of the ohmic coupling factor $K_R$, without data having to be exchanged between the two welding power sources 4-1, 4-2 via a communication connection KV. In this embodiment, the current profile SP applied in the first welding circuit 2-1 is likewise stored in the data store 9-2 of the second welding circuit 2-2 and can be drawn on for calculating a corresponding compensation voltage $U_{Komp}$.

In one possible embodiment, a start time of the applied current profile SP may be detected by way of the change in voltage at the receiving welding power source 4-2 using the measurement signal measured by the measurement unit 8-2 thereof, in such a way that the various phases or measurement windows MF can be synchronised. This is possible because the time profile or current profile SP of the transmitting welding power source 4-1 is stored at the receiving welding power source 4-2 in the data store 9-2.

In one possible embodiment, a first number of transmitter sync cycles can be started up, which have a relatively steep rise in current (di/dt), so as to synchronise the receiver or detector 8-2 of the receiving welding power source 4-2 even in the event of weak coupling between the welding circuits 2-$i$. In a subsequent time window, the actual measurement profile sequence can subsequently be started up.

Figure 8A:
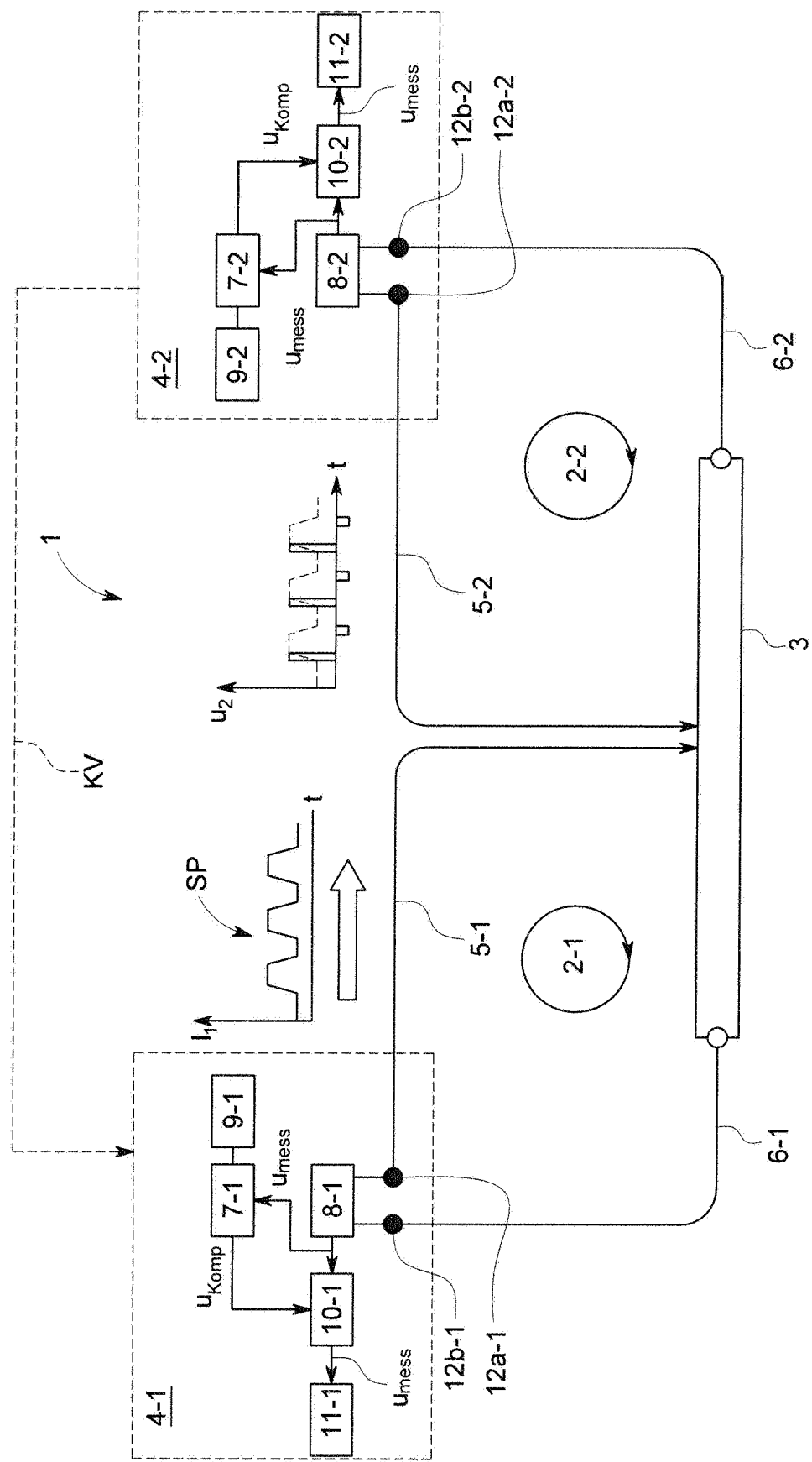
FIG. 8A, 8B are schematic drawings of a welding system comprising two welding circuits, illustrating the mode of operation of the method according to the invention, shown in FIG. 7, for determining an interfering coupling between the welding circuits of the welding system.

In the embodiment shown in FIG. 8A of the welding system 1, the two welding circuits 2-1, 2-2 are short-circuited via the workpiece 3, while not having a shared line portion, in particular via the workpiece 3. In the embodiment shown in FIG. 8B of the welding system 1, two welding circuits 2-1, 2-2 for welding two different workpieces 3-1, 3-2 are provided. The two welding circuits 2-1, 2-2 in the embodiment shown in FIG. 9 have a shared line portion, since the earth line or return line 6-2 of the second welding circuit 2-2 is branched off at a node K of the earth line or return line 6-1 of the first welding circuit 2-1. The shared line portion shown in FIG. 9 thus comprises portions of the earth line 6-1 of the first welding circuit 2-1 as well as a line connection via the workpiece 3. The ohmic portion of the measured coupling $R_{Koppel}$, which is reflected in the ohmic coupling factor $K_R$, indicates the presence of a shared line of this type.

The calculated coupling factors $K_L$, $K_R$ can be stored and, in one possible embodiment, drawn on for determining a compensation voltage $U_{Komp}$ on the basis of the current profile SP of the current $I_1$ applied to the first welding circuit 2-1. In one possible embodiment, this determined compensation voltage $U_{Komp}$ is subtracted from a measured voltage $U_{Mess}$ during the welding operation, which is preferably measured by a voltage measurement unit 8-1 of a welding power source 4-1 located in the first welding circuit 2-1, so as to determine a corrected measured voltage $U'_{Mess}$ which can be used for regulating a welding current Is generated by the welding power source 4-1 during welding operation.

FIG. 10 shows, by way of example, signal progressions for a measurement cycle in the welding system 1 according to the invention. In the shown example, a plurality, for example 20, of measurement cycles of this type are outputted at a time interval of for example 30 ms by the transmitting welding power source 4-1 and the individual cycle measurement values t0 to t1 (MF2) and t2 to t3 (MF1) are averaged.

In FIG. 10, a first curve I shows the current progression $I_1$ in the transmitting welding circuit 2-1. A further curve II shows the voltage progression $U_1$ in the transmitting welding circuit 2-1. A further curve III shows the voltage progression $U_2$ in the receiving welding circuit 2-2. As can be seen in FIG. 10, between times $t_2$ and $t_3$ the level of the current profile SP applied by the welding power source 4-1 of the first welding circuit 2-1 is constant and forms a measurement window $MF_1$ for determining the ohmic portion of the interfering coupling between the two welding circuits. The ohmic portion of the coupling between the two welding circuits 2-1, 2-2 of the welding system 1 can be determined in the first measurement window MF1. This first measurement window MF1 is in a phase of the current profile SP applied in the welding circuit 2-1 where the level of the applied current h is constant.

By contrast, between times t0 and t1 (MF1) the inductive portion of the coupling between the welding circuits 2-i of the welding system 1 is determined. This period between t0 and t1 forms a second measurement window MF2 in which the level SP of the applied current $I_1$ rises relatively strongly during a rising flank of the current pulse, as shown in FIG. 10. The inductive portion of the coupling between the welding circuits 2-1 of the welding system 1 is determined in the second measurement window MF2 on the basis of the current profile SP applied in the first welding circuit 2-1 and of the voltage progression and/or current progression determined in the second welding circuit 2-2. The second measurement window MF2 is in a phase of the current profile SP applied in the first welding circuit 2-1 where the level of the applied current $I_1$ is rising during the rising flank of the current pulse. Alternatively, the second measurement window MF2 may also be in a phase of the current profile SP applied in the first welding circuit 2-1 where the level of the applied current $I_1$ is falling during a falling flank of the current pulse. As can be seen from FIG. 10, the determination or measurement of the ohmic portion of the coupling takes place in a different measurement window MF from the determination of the inductive portion of the coupling.

In one possible embodiment, an ohmic voltage portion can be calculated, from the transmitter current $I_1$ currently flowing in the first welding circuit 2-1 in the first measurement window (MF1$_n$) and from a resistance determined in a preceding cycle in a phase between $t_2$ and $t_3$ (MF1$_{n-1}$), and subtracted from the measurement values. For example, every 25 μs a measurement value is stored and the ohmic voltage portion is subtracted therefrom. The individual measurements minus the ohmic portion can be added up during the phase $t_0$ to $t_1$ (second measurement window MF2). From this, an arithmetic mean can be calculated at the end of $t_1$. In turn, from an arithmetic mean of a phase, the mean over a plurality of cycles, for example 20 cycles, can be calculated.

From this calculated voltage average $U_{empf\_ind}$ and the change in current di/dt in the transmitter current progression, in one possible embodiment the coupling inductivity $K_L$ may be calculated using the following formula:

$$L_{kopp} = U_{empf\_ind}/(di/dt \text{ transmitter})$$

Figure 11:
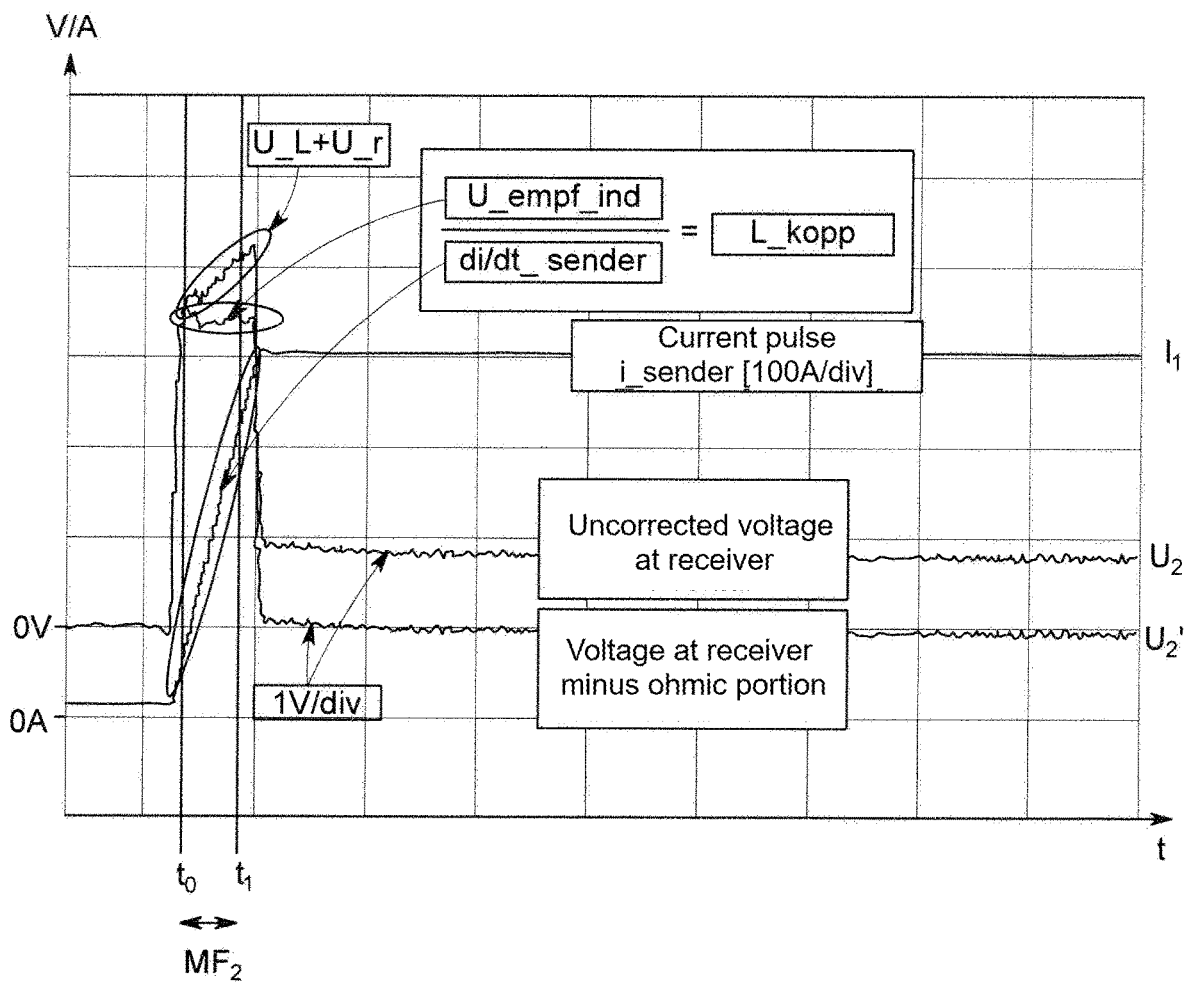
FIG. 11 shows further signal progressions illustrating the mode of operation in a possible embodiment of the method, shown in FIG. 7, for determining an interfering coupling between welding circuits of a welding system.

FIG. 11 shows by way of example a measurement cycle of this type.

In one possible embodiment, before the actual coupling factor measurement, after the activation of the welding system 1 by a user, a synchronisation sequence takes place in that the transmitting welding power source 4-1 is set. For example, a synchronisation sequence of this type may be started up by pressing a button on the above-defined transmitting welding power source 4-1.

Thereupon, the transmitting welding power source 4-1 feeds a current pulse (transmitter start-up pulse) having a rising gradient of for example 1000 A/ms and a target current of 500 A into the short-circuited transmitting welding circuit 2-1.

By way of the magnetic coupling, an electric voltage $U_2$, the level of which depends on the laying of the lines of the two welding circuits 2-1, 2-2 and which is measured at the output terminals of the receiving welding power source 4-2 by the measurement unit 8-2 thereof, is induced in the likewise short-circuited receiving welding circuit 2-2. In one possible embodiment, the transmitter start-up pulse may be detected at the receiving welding power source 4-2 by evaluating the absolute voltage value or voltage progression or alternatively by evaluating a rate of change over a predetermined time interval, in other words differentially.

If a voltage $U_2$ exceeds a value of for example 0.5 V pre-set at the receiving welding power source 4-2, in one possible embodiment a measurement time sequence scheme identical to the one in the transmitting welding power source 4-1 can be started up.

The detection of the rise in transmitter welding current at the receiver may also take place in that the change in voltage du/dt in the voltage U induced in the receiving welding power source 4-2 is detected. For this purpose, the voltage difference may be calculated, for example at a time interval of 25 μs, from the continuously detected voltage signal. If for example this voltage difference exceeds a value of for example 0.2 V, a measurement time sequence scheme identical to the one in the transmitting welding power source 4-1 may be started up.

In a further possible embodiment, a combination of the two evaluation methods is possible, in other words a combination of absolute evaluation and differential evaluation.

Figure 8B:
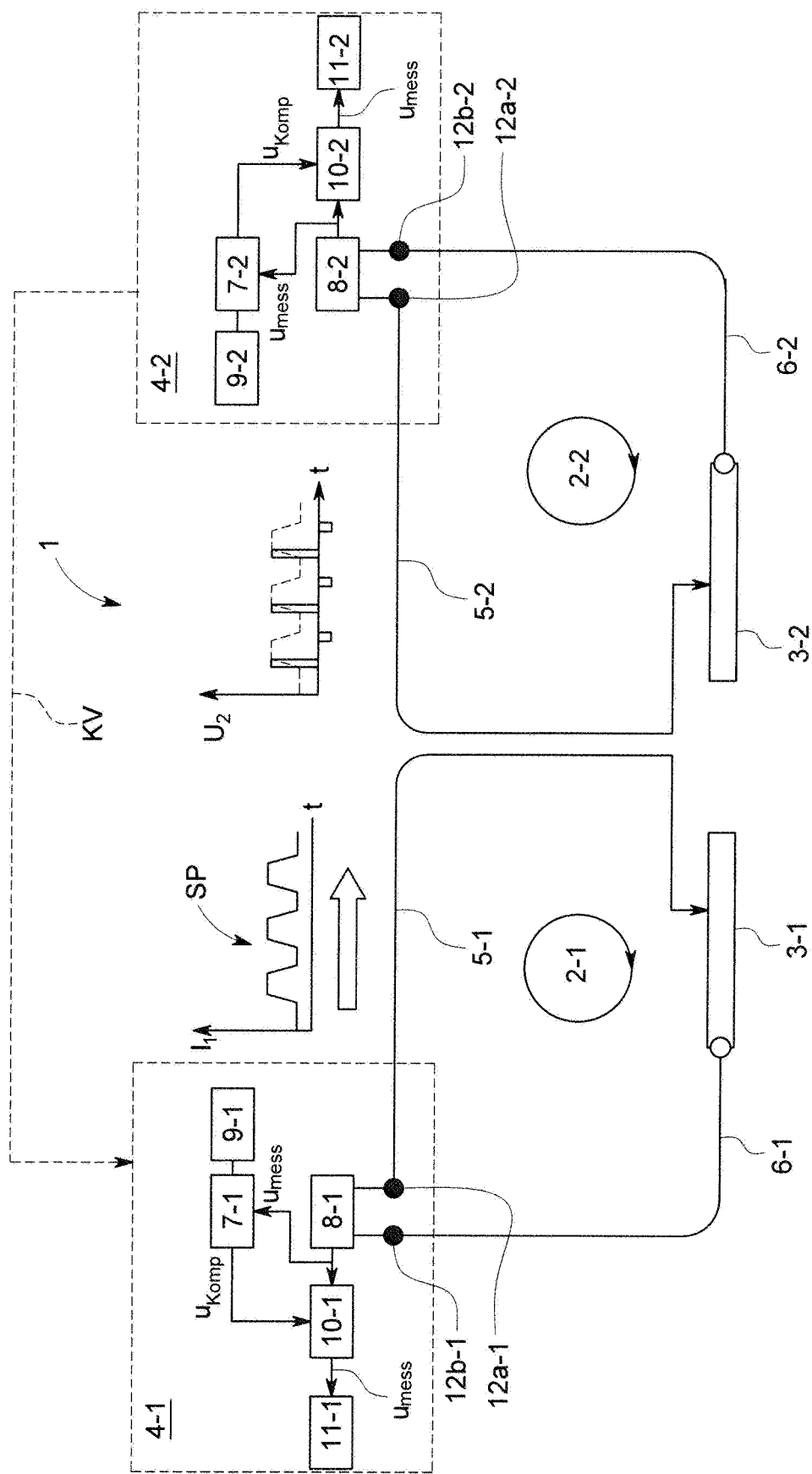
Figure 9:
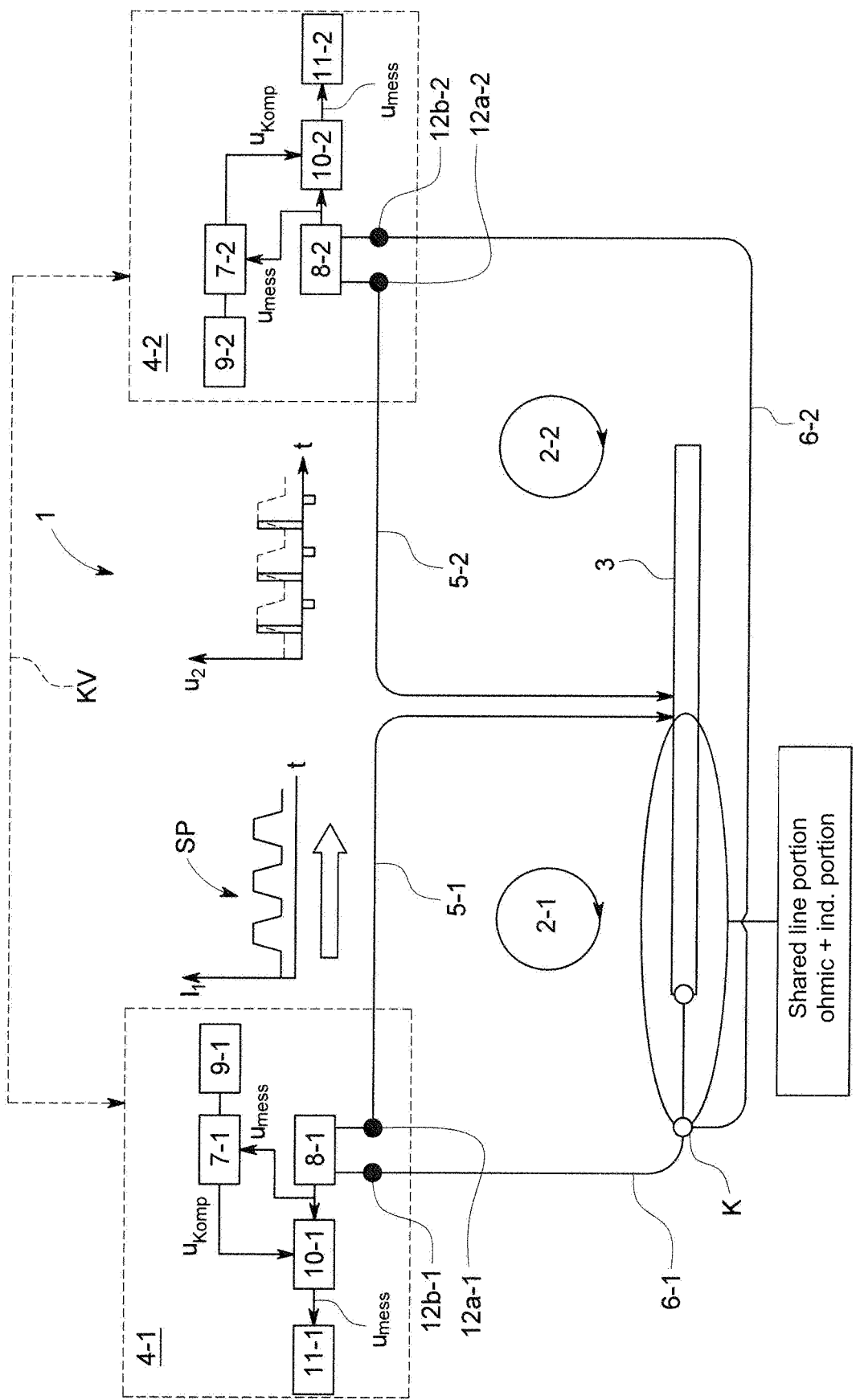
FIG. 9 is a further schematic drawing of a welding system comprising two welding circuits, illustrating the method according to the invention, shown in FIG. 7, for determining an interfering coupling between the welding circuits of the welding system.

The welding system 1 shown in FIG. 8A, 8B, 9 thus has a coupling determination unit which determines an interfering coupling between the welding circuits 2-1, 2-2 of the welding system 1. In one possible embodiment, one or both welding power sources 4-1 of the welding system 1 have a coupling determination unit or calculation unit 7-i of this type. In an alternative embodiment, a coupling determination unit of the welding system 1 can be formed by a separate unit, which preferably is connected to the various welding power sources 2-i of the welding system 1 and communicates therewith via a wireless or wired communication connection KV. The coupling determination unit is configured to carry out the determination method shown in FIG. 7.

Figure 12:
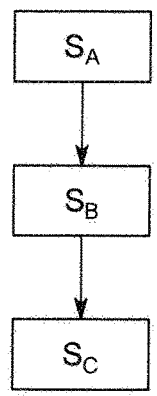
FIG. 12 is a flow chart showing a possible embodiment of a method according to the invention for compensating an interfering influence on a welding current, provided by a welding power source for welding a workpiece, from another welding power source, used for welding the same workpiece, in accordance with a further aspect of the invention.

Once the coupling factors $K_L$, $K_R$ have been determined using the method shown in FIG. 7, automatic compensation of this determined interfering influence preferably takes place by a compensation method in accordance with a further aspect of the invention. FIG. 12 is a flow chart of a possible embodiment of a compensation method for compensating an interfering influence on a welding current Is, provided by a welding power source 4 for welding a workpiece 3, from another welding power source 4' used for welding the same workpiece 3.

In the embodiment shown in FIG. 12, the compensation method according to the invention comprises three main steps.

In a first step SA, a compensation voltage $U_{Komp}$ is calculated by a computation unit 7-2 of a (receiving) welding power source 4-2 on the basis of a welding current progression of the other welding power source 4-1 provided by the other welding power source 4-1. This compensation voltage $U_{Komp}$ can be calculated by the computation unit 7-2 of the welding power source 4-2 on the basis of a current profile SP of the current progression $I_1$ provided by the other welding power source 4-1 and on the basis of stored coupling factors KF. Alternatively, this current profile SP is already present in a local data store 9-2 of the welding power source 4-2. The coupling factors KF comprise an ohmic coupling factor $K_R$ and at least one inductive coupling factor $K_L$ and are stored for example in the data store 9-2 of the welding power source 4-2. Alternatively, the compensation voltage $U_{Komp}$ may also be calculated by a computation unit 7-1 of the other (transmitting) welding power source 4-1, and the calculated compensation voltage $U_{Komp}$ is then transmitted to the (receiving) welding power source 4-2 via a communication connection KV.

In a further step SB, the compensation voltage $U_{Komp}$ calculated by a computation unit in step SA is subtracted from a measured voltage $U_{Mess}$ measured by a voltage measurement unit 8-2 of the welding power source 4-2 to determine a corrected measured voltage $U'_{Mess}$. In one possible embodiment, the compensation voltage $U_{Komp}$ calculated by the computation unit 7-2 of the welding power source 4-2 or the compensation voltage $U_{Komp}$ transmitted via a communication connection is subtracted continuously, by a compensation unit 10-2 of the (receiving) welding power source 4-2, from the measured voltage $U_{Mess}$ measured by the voltage measurement unit 8-2 of the (receiving) welding power source 4-2 to determine the corrected measured voltage $U'_{Mess}$.

In a further step $S_C$, the welding current Is generated by the welding power source 4-2 is regulated as a function of the corrected measured voltage $U'_{Mess}$. In one possible embodiment, the welding current Is regulated by means of the corrected measured voltage $U'_{Mess}$ may be supplied to a welding torch 13-2 for welding the workpiece 3 via a welding current line 5-2 of the welding power source 4-2. In one possible embodiment of the compensation method according to the invention, the current profile SP of the welding current progression Is of the other welding power source 4-1 is read out from the data store 9-2 of the welding power source 4-2. In one embodiment of the compensation method according to the invention, the current profile SP of the welding current progression Is of the other welding power source 4-1 is transmitted from the other welding power source 4-1, wirelessly or in a wired manner via a communication connection KV, to the calculation unit 7-2 of the welding power source 4-2, which calculates the compensation voltage $U_{Komp}$ on the basis of the transmitted welding current progression and on the basis of stored coupling factors KF. While the welding process is running, there are also current progressions which are generated dynamically in accordance with the process state (short circuit) and which run in an event-based manner rather than cyclically. Therefore, in the compensation which takes place while the welding process is running, the transmitter current profile is transmitted directly to the receiver so as to achieve correct compensation of the coupling voltage. The current profile SP of the welding current progression $I_S$ of the other welding power source 4-1 preferably comprises current levels and changes in current level along with associated time values. The compensation voltage $U_{Komp}$ calculated by the computation unit 7-2 of the welding power source 4-2 may subsequently be subtracted continuously, by the compensation unit 10-2 of the welding power source 4-2, from the measured voltage $U_{Mess}$ measured by the voltage measurement unit 8-2 of the welding power source 4-2, to determine a corrected measured voltage $U'_{Mess}$. This corrected measured voltage $U'_{Mess}$ is subsequently used for regulating the welding current Is passed via the welding current line of the welding power source 4-2 to the associated welding torch SB. The compensation method according to the invention in accordance with FIG. 12 thus makes it possible to cancel out an undesired induced voltage from the measurement signal. As a result, the mutual influence of the welding circuits 2-i can be reduced or eliminated.

The compensation method according to the invention in accordance with FIG. 12 thus accesses previously determined and stored coupling factors KF, in particular at least one ohmic coupling factor $K_R$ and one or more inductive coupling factors $K_L$. Preferably, in the compensation method according to the invention, the current profile SP, in other words the present current progression, and a rate of change of current (di/dt) of the current I outputted by the other transmitting welding power source 4-1 are transmitted continuously or constantly to the receiving welding power source 4-2 via a communication connection KV.

From the current profile data, in other words from the absolute current value in amps and from the rate of change of current di/dt (A/ms), using the previously determined coupling inductance L (mH) and the ohmic coupling factor R (mΩ), a coupling voltage can be calculated using the following formula:

$$U_{kopp} = L_{kopp} \times di/dt + R_{Leitung} \times \text{transmitter current}$$

This coupling voltage follows the progression over time of the current profile SP of the induced transmitter power source 4-1, and can be subtracted continuously, as a signed number, as a compensation voltage $U_{Komp}$, from the voltage $U_{Mess}$ measured at output sockets of the receiving welding power source 4-2 by the measurement unit 8-2 thereof. This measured voltage $U'_{Mess}$ corrected by the induced voltage portion is subsequently used for the process regulation 11-2 of the receiving welding power source 4-2. As a result, the mutual influence of the welding circuits 2-1, 2-2 is reduced or completely eliminated.

In a preferred embodiment, the calculation of the compensation voltage $U_{Komp}$ and the determination of the corrected measured voltage $U'_{Mess}$ take place digitally. In an alternative embodiment, the calculation of the compensation voltage $U_{Komp}$ and the determination of the corrected measured voltage $U'_{Mess}$ take place in an analogue manner.

Figure 13:
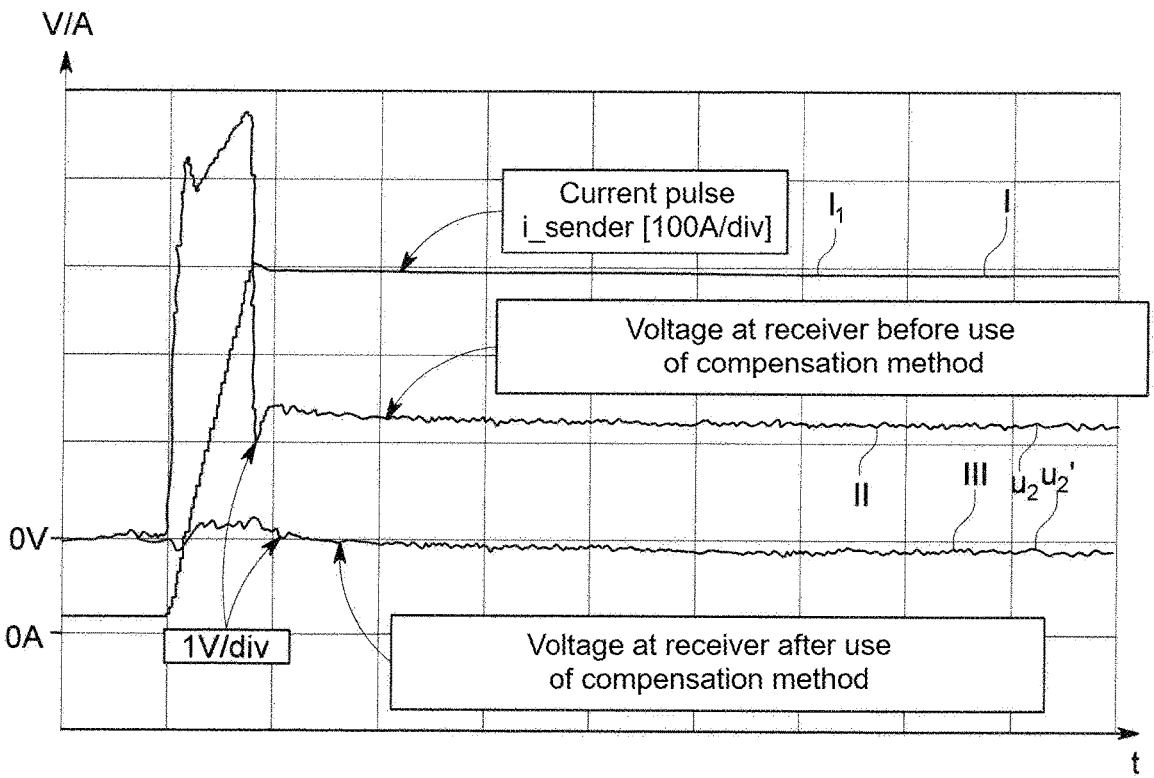
FIG. 13 shows signal progressions illustrating the mode of operation of an embodiment of the communication method shown in FIG. 12.

FIG. 13 is a signal diagram with voltage progressions at the receiving welding power source 4-2 before and after application of the compensation method according to the invention shown in FIG. 7.

Curve I in FIG. 13 shows the current progression at the transmitting welding power source 4-1. Curve II shows the voltage progression at the receiving welding power source 4-2 before application of the compensation method according to the invention.

Curve III in FIG. 13 shows the voltage progression at the receiving welding power source 4-2 after application of the compensation method according to the invention.

The method according to the invention for compensating an interfering influence between at least two welding circuits 2-1, 2-2 is suitable not only for detection and compensation in welding circuits having a constant welding circuit inductance L or coupling factor, but also in welding circuits having welding circuit inductances L(t) which vary over time. The welding circuit inductance L of the welding circuit 2-i can vary with the amplitude of the current. This is the case for example if there are ferromagnetic substances in the welding circuit 2-i.

In one possible embodiment of the method according to the invention, the inductive portion of the coupling between the welding circuits 2-i of the welding system 1 is detected within a measurement window MF, which is subdivided into smaller time intervals, the individual induction values $L_i$ for the corresponding current values being determined and stored for each time interval. Subsequently, for the compensation method according to the invention, in each case the individual stored induction values $L_i$ at the associated current values $I_t$ of the present current of the transmitting welding circuit 2-1 are called from the local data store and used for calculating the coupling voltage or compensation voltage $U_{Komp}$.

Figure 14:
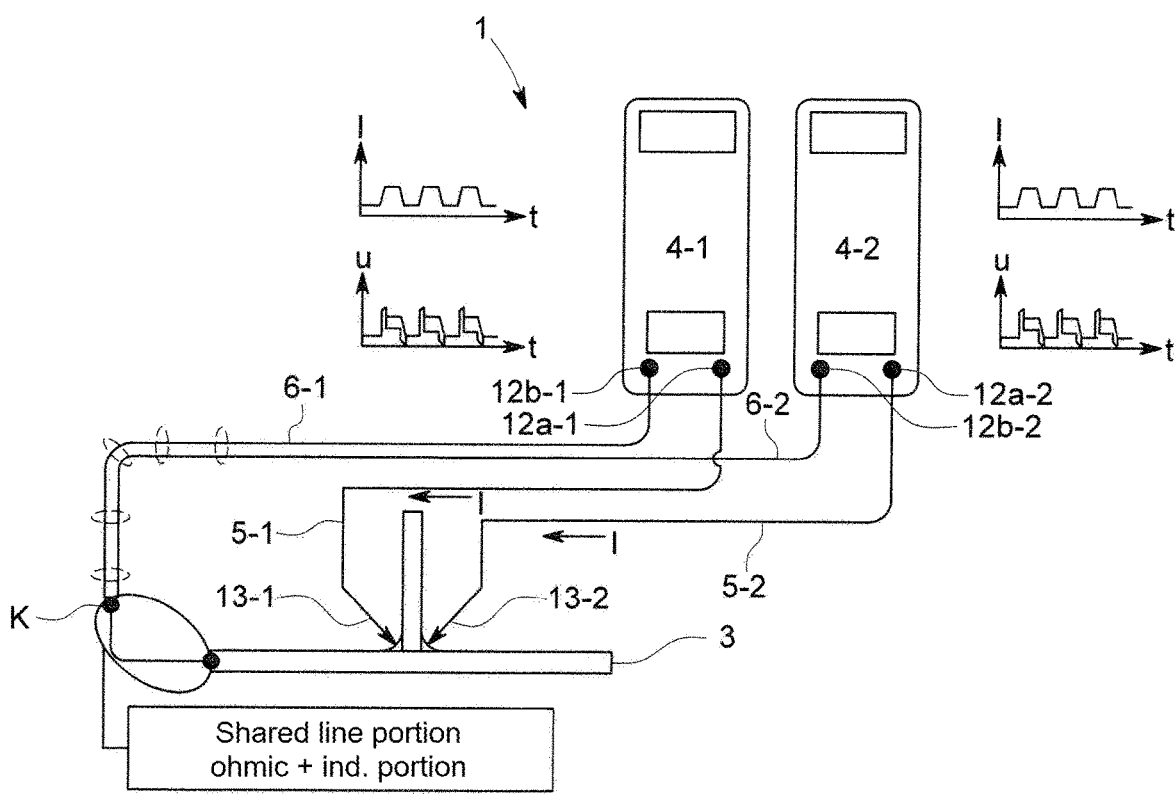
FIG. 14 is a schematic drawing illustrating a coupling effect between two circuits of a welding system.

FIG. 14 shows a practical example of the coupling effect of two welding circuits 2-1, 2-2 on one another. In the embodiment shown, the earth lines 6-1, 6-2 of the welding circuits 2-1, 2-2, which are branched at the node K in the welding system 1 of FIG. 14, are laid largely mutually parallel, in such a way that they induce a magnetic coupling when a current flows through the earth lines 6-1, 6-2. The parallel earth lines 6-1, 6-2 are responsible for the inductive (magnetic) coupling. The supply lines 5-1, 5-2 each supply a welding current Is to a welding torch 13-1, 13-2.

Figure 15:
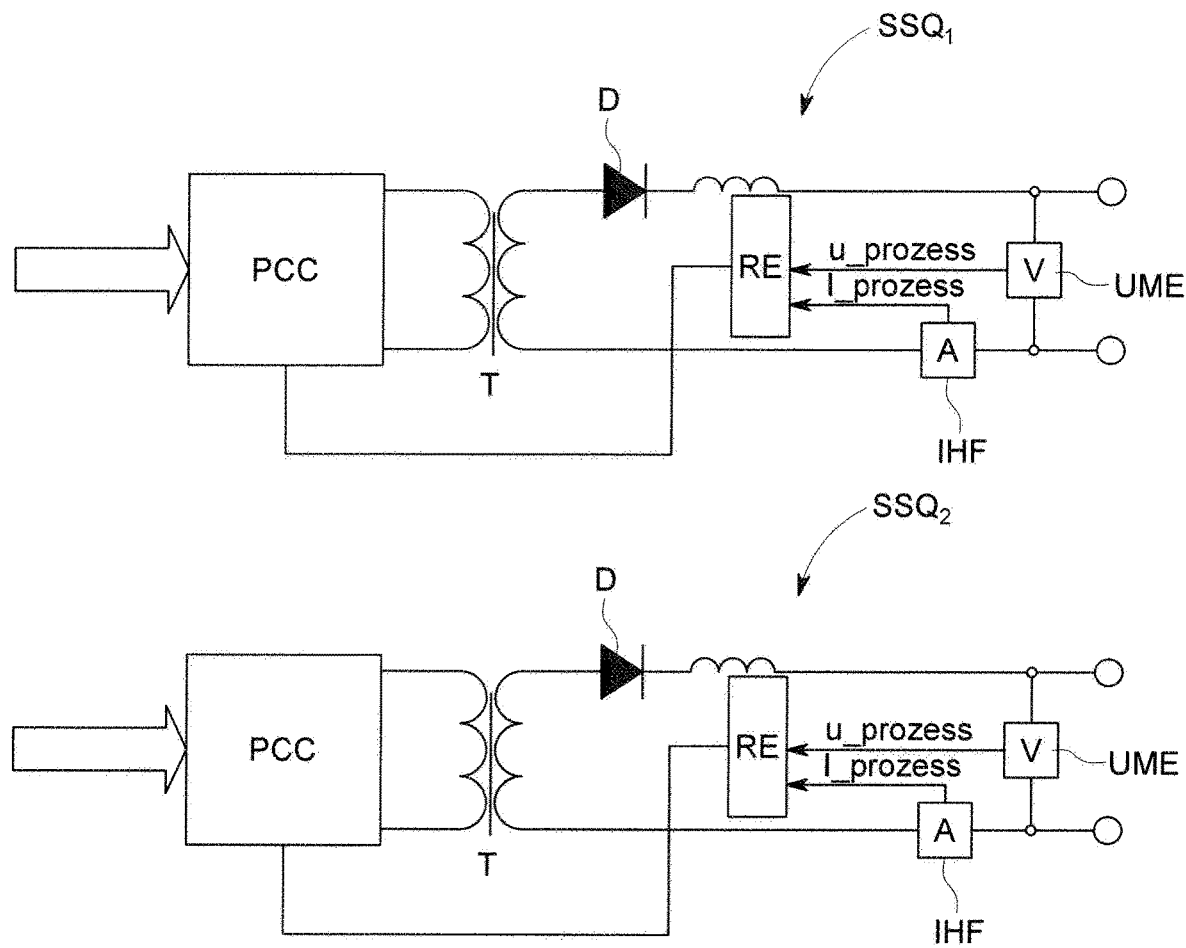
FIG. 15 is a schematic drawing of power sources without coupling compensation according to the invention.

FIG. 15 schematically shows two welding power sources SSQ without the presence of coupling compensation in accordance with the compensation method according to the invention. As can be seen in FIG. 15, the two welding circuits SSK are separate from one another. Each welding power source SSQ has a voltage measurement unit UME and a current measurement unit IHF, which supply measurement values to a regulation unit RE. The regulation unit is connected to a power conversion control system PCC. The welding power sources SSQ contain a transformer T and a rectifier diode D.

Figure 16A:
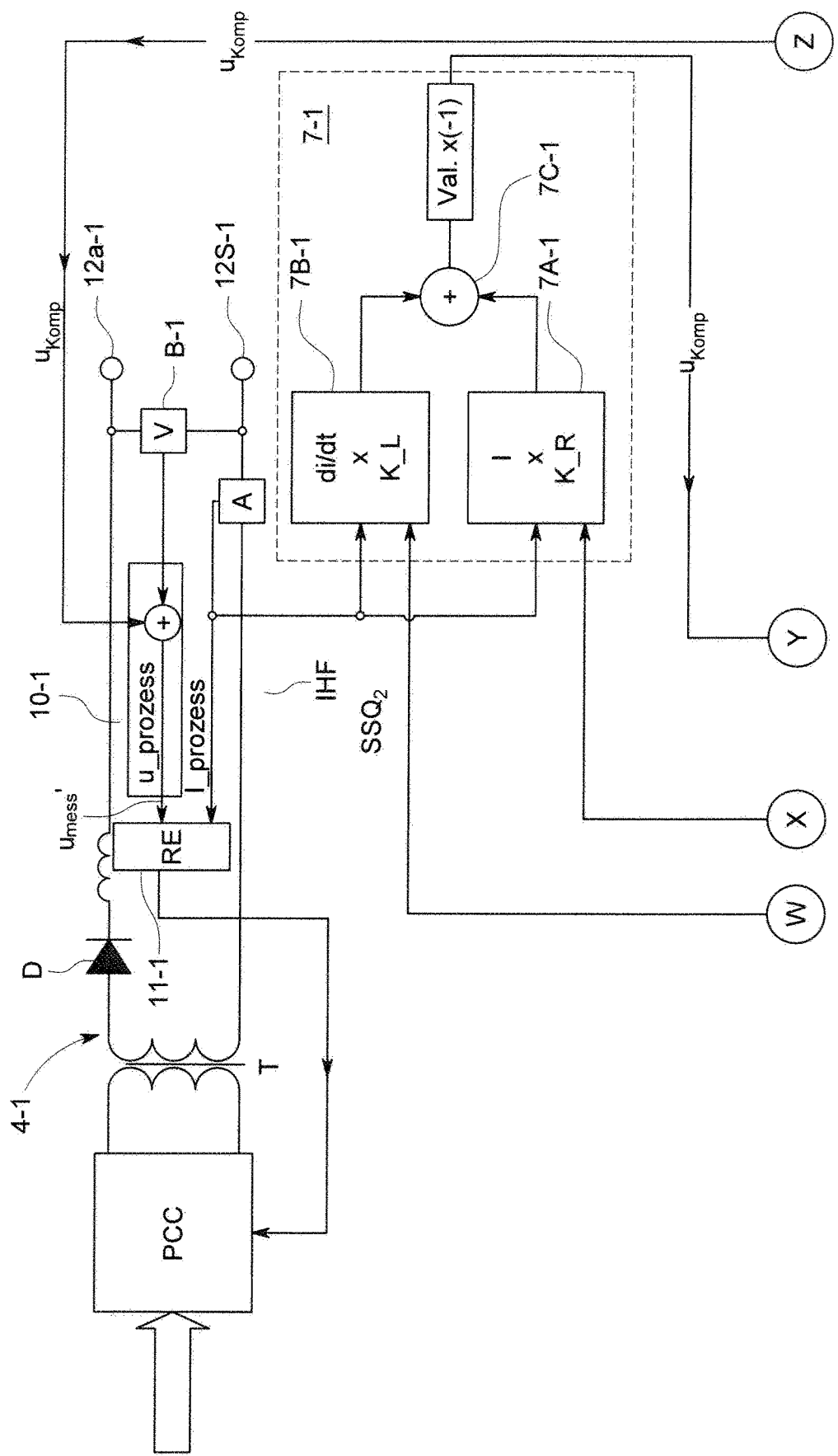
FIG. 16 is a schematic drawing of power sources with coupling compensation according to the invention in accordance with the compensation method shown in FIG. 12.
Figure 16B:
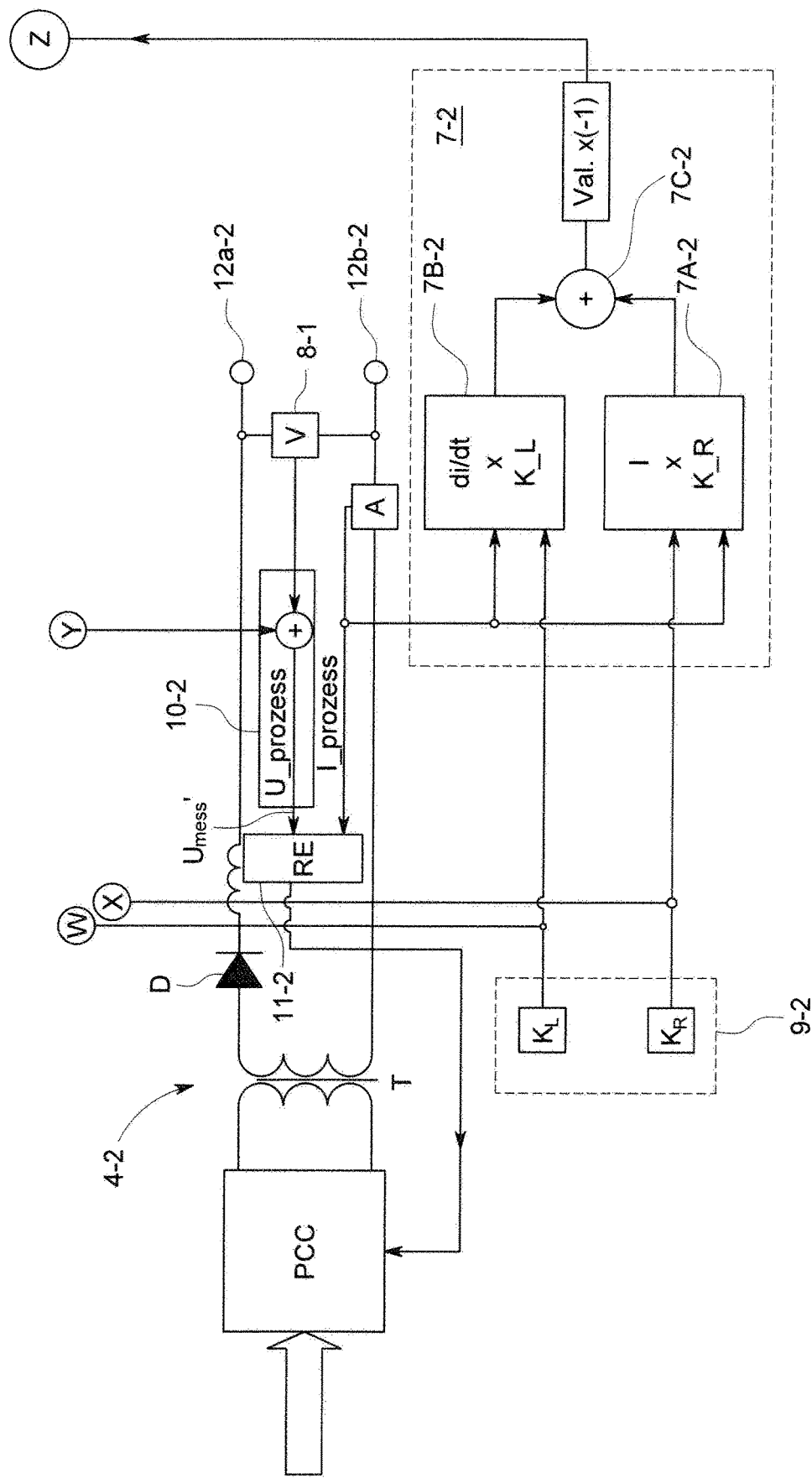

By contrast, FIG. 16 schematically shows two welding power sources 4-1, 4-2 of a welding system 1 in which the compensation method according to the invention is carried out. Each of the two welding power sources 4-1, 4-2 shown in FIG. 16 is used for generating a welding current, which can be supplied via a welding current line to a welding torch 13-1, 13-2 for welding a workpiece 3. Each of the two welding power sources 4-1, 4-2 has a computation unit 7-1, 7-2 and a compensation unit 10-1, 10-2. The computation units 7-1, 7-2 form part of the welding power sources 4-1, 4-2, as is also shown in FIG. 8A, 8B. The computation unit 7-$i$ of the welding power source 4-$i$ is suitable for calculating a compensation voltage $U_{Komp}$ as a function of a voltage $U_{Mess}$, induced by the welding current progression of the other welding power source used for welding the same workpiece 3 and measured by the measurement unit 8-$i$, and as a function of stored coupling factors KF. The compensation unit 10-$i$ of the welding power source 4-$i$ is suitable for subtracting the compensation voltage $U_{Komp}$, calculated by the computation unit 7-$i$ of the welding power source 4-$i$, from the measured voltage $U_{Mess}$, measured by the voltage measurement unit 8-$i$ of the welding power source 4-$i$, to generate a corrected measured voltage $U'_{Mess}$, which is used by a regulation unit 11-$i$ of the welding power source 4-$i$ for regulating the welding current Is generated by the welding power source 4-$i$.

The computation unit 7-$i$ of the welding power source 4-$i$ preferably calculates the compensation voltage $U_{Komp}$ on the basis of a current profile SP of the welding current $I_S$ provided by the other welding power source and on the basis of coupling factors KF, which are preferably stored in a data store 9-$i$ of the associated welding power source 4-$i$. In the embodiment shown in FIG. 16, an inductive coupling factor $K_L$ and an ohmic coupling factor $K_R$ are stored in a local data store 9-2 of the second welding power source 4-2. These coupling factors KF can be read out by the computation unit 7-1 of the first welding power source 4-1 via a communication interface. Alternatively, the coupling factors $K_R$, $K_L$ may also be stored locally in the two welding power sources 4-1, 4-2. Further, it is possible for the stored coupling factors $K_R$, $K_L$ to be read out from a central data store via a data network.

As is shown in FIG. 16, each of the welding power sources 4-1, 4-2 has a dedicated computation unit 7-1, 7-2. In a preferred embodiment, each of the computation units 7-1, 7-2 has a first multiplier 7A, a second multiplier 7B and an adder 7C. The first multiplier 7A of the computation unit 7 multiplies a present current level I within the current profile by an ohmic coupling factor $K_R$ to calculate an ohmic portion of the compensation voltage $U_{KompR}$. The second multiplier 7B of the computation unit 7 multiplies a present change in current level di/dt within the current profile SP by a read-out inductive coupling factor $K_L$ to calculate an inductive portion of the compensation voltage $U_{KompL}$. The calculation unit 7-$i$ of the welding power source 4-1 in each case further comprises an adder 7B-$i$, which adds the ohmic portion of the compensation voltage UKompR and the inductive portion of the compensation voltage $U_{KompL}$ to calculate the compensation voltage $U_{Komp}$. In the embodiment shown in FIG. 16, the compensation voltage $U_{Komp}$ determined in this manner is in each case transmitted to the other welding power source. Each welding power source 4-1, 4-2 has a dedicated compensation unit 10-1, 10-2, as shown in FIG. 16. The compensation unit 10 of a welding power source 4 is configured in such a way that it obtains the compensation voltage $U_{Komp}$, calculated by its own computation unit or the computation unit 7 of the other welding power source, and subtracts it from a measured voltage $U_{Mess}$, measured the dedicated voltage measurement unit 8 of the welding power source 4, to determine a corrected measured voltage $U'_{Mess}$. This corrected measured voltage $U'_{Mess}$ is applied by the compensation unit 10-$i$ to a regulation unit 11-$i$ of the welding power source 4, and is used for regulating the welding current Is generated by the welding power source 4.

In the embodiment shown in FIG. 16, the compensation voltage $U_{Komp}$ is calculated by a computation unit of the other welding power source 4', and the calculated compensation voltage is transmitted. Alternatively, the compensation voltage $U_{Komp}$ may also be calculated by a dedicated computation unit 7 on the basis of a current profile SP transmitted by the other welding power source 4' via a communication connection. Further, in a further alternative embodiment, the computation unit 7 of a welding power source 4 may read out a known, predetermined current profile SP of the other welding power source 4' from a local, dedicated data store 9 of the welding power source 4 and calculate the compensation voltage or compensation voltage profile therefrom by means of the coupling factors $K_R$, $K_L$ which are also read from the local data store 9 of the welding power source 4. In a further embodiment, the compensation voltage profile is calculated in advance in accordance with the coupling factors KF and the predefined current profile SP and stored in a local data store 9 of the welding power source.

In the embodiment shown in FIG. 16, the compensation voltage $U_{Komp}$ and the corrected measured voltage $U_{Mess}$ are calculated using multipliers 7A, 7B and adders 7C of the calculation unit 7 using predetermined calculation formulae. Instead of stored and implemented calculation formulae, in an alternative embodiment a stored lookup table LUT may also be used.

The voltage correction values or compensation voltage profile measured during the coupling factor determination are stored in the lookup table LUT. In the lookup table LUT, the measured voltages (e.g. X-axis) are plotted against the associated currents I (e.g. Y-axis) and changes in current (di/dt) (e.g. Z-axis).

When the compensation method is carried out during the welding process, the present actual current value and the actual change in current of the other welding power source 4' are plotted on the Y-axis and the Z-axis, and the associated voltage value (X-axis) is read out and subtracted from the internal presently measured voltage $U_{Mess}$.

Preferably, the individual coupling values (voltages for inductive and ohmic coupling) are detected and stored in the lookup table LUT. As is shown in FIG. 9, the two welding circuits 2-1, 2-2 may be short-circuited. The transmitting welding power source 4-1 may for example run a first current profile at 50 A/ms in a range of 0 to 500 A. The receiving welding power source 4-2 measures its own present voltages and the present current and change-in-current values of the transmitting welding power source 4-1, and enters the measured voltages at the corresponding table point within the lookup table LUT. This process can subsequently be repeated for further current profiles (for example 100 A/ms and 0 to 500 A up to 1000 A/ms and 0 to 500 A).

In a further step, the actual compensation takes place during the welding process. In the compensation during the welding process, the present actual current value and change-in-current actual value of the other welding power source are plotted on the Y-axis and Z-axis, and the associated voltage value (X-axis) is read out and subtracted from the internal presently measured voltage.

This compensation may for example be carried out cyclically at regular time intervals of for example 25 µs. Values between those in the table may preferably be obtained by linear interpolation.

The following table is an example of occurring coupling voltages (or compensation voltages) in volts for the values of R_Koppel=25 mΩ and L_koppel=20 µH:

| Strom/di_dt | 0 | 100 | 200 | 300 | 400 | 500 | 600 | 700 | 800 | 900 | 1000 | [A/ms] |
|---|---|---|---|---|---|---|---|---|---|---|---|---|
| 0 | 0,000 | 2,000 | 4,000 | 6,000 | 8,000 | 10,000 | 12,000 | 14,000 | 16,000 | 18,000 | 20,000 | |
| 50 | 1,250 | 3,250 | 5,250 | 7,250 | 9,250 | 11,250 | 13,250 | 15,250 | 17,250 | 19,250 | 21,250 | |
| 100 | 2,500 | 4,500 | 6,500 | 8,500 | 10,500 | 12,500 | 14,500 | 16,500 | 18,500 | 20,500 | 22,500 | |
| 150 | 3,750 | 5,750 | 7,750 | 9,750 | 11,750 | 13,750 | 15,750 | 17,750 | 19,750 | 21,750 | 23,750 | |
| 200 | 5,000 | 7,000 | 9,000 | 11,000 | 13,000 | 15,000 | 17,000 | 19,000 | 21,000 | 23,000 | 25,000 | |
| 250 | 6,250 | 8,250 | 10,250 | 12,250 | 14,250 | 16,250 | 18,250 | 20,250 | 22,250 | 24,250 | 26,250 | |
| 300 | 7,500 | 9,500 | 11,500 | 13,500 | 15,500 | 17,500 | 19,500 | 21,500 | 23,500 | 25,500 | 27,500 | |
| 350 | 8,750 | 10,750 | 12,750 | 14,750 | 16,750 | 18,750 | 20,750 | 22,750 | 24,750 | 26,750 | 28,750 | |
| 400 | 10,000 | 12,000 | 14,000 | 16,000 | 18,000 | 20,000 | 22,000 | 24,000 | 26,000 | 28,000 | 30,000 | |
| 450 | 11,250 | 13,250 | 15,250) | 17,250 | 19,250 | 21,250 | 23,250 | 25,250 | 27,250 | 29,250 | 31,250 | |
| 500 | 12,500 | 14,500 | 16,500 | 18,500 | 20,500 | 22,500 | 24,500 | 26,500 | 28,500 | 30,500 | 32,500 | |
| [A] | | | | | | | | | | | | |

There may also be a plurality of LUTs (lookup tables), which are selected depending on the situation. In robot gantry systems, the coupling inductance may vary depending on the position of the individual robots mountable on the carriageways, since the position of the welding cables 5-1, 5-2 with respect to one another changes. It is therefore also possible for the coupling factors or compensation voltages to be selected from further LUTs depending on the robot positions relative to one another. The advance determination of the coupling factors KF then also takes place at a plurality of robot positions fixed by the user. The selection of the LUTs is preferably made by a control system of the robot.

As a result of the compensation method according to the invention, the quality of the welding process can be greatly improved, meaning that the weld seam resulting from the welding process is qualitatively improved, since interfering influences from another welding power source used for welding the same workpiece 3 are reduced or compensated. The compensation method according to the invention may be carried out digitally, but also in an analogue manner. The compensation method according to the invention is suitable in particular for welding systems 1 in which a plurality of welding power sources 4-i weld simultaneously in a system/cell. The voltage couplings which occur in this context result in the measured voltage $U_{Mess}$ used as a regulating variable being distorted. As a result of the compensation method according to the invention, the measured voltage $U_{Mess}$ is corrected to be free of interfering variables. This greatly improves the welding outcome of the welding system 1.

By way of the calculated coupling factors $K_R$, $K_L$, the user of the welding system 1 additionally obtains information regarding the degree of the interfering coupling between welding circuits of the welding system 1. In one possible embodiment of the compensation method according to the invention, the calculated coupling factors are used so as to reduce or eliminate an interfering influence on a welding current Is, provided by a welding power source for welding a workpiece 3, from the other welding power source used for welding the same workpiece 3. On the other hand, a user of the welding system 1 can draw on the calculated or determined coupling factors $K_R$, $K_L$ so as to optimise the welding system 1, in particular the laying of the lines of the various welding circuits 2-i, himself. By way of a display of the welding power sources, a user can be informed as to the level of the inductive and/or ohmic coupling between the welding circuits 2-i. The method according to the invention for determining an interfering coupling between welding circuits 2-i of a welding system 1 is suitable in particular for welding systems 1 comprising two or more welding circuits 2-i or welding power sources 4-i.

The invention claimed is:

1. A method for compensating an interfering influence on a welding current, provided by a welding power source for welding a workpiece, from another welding power source, comprising the steps of:
providing a compensation voltage ($U_{Komp}$), which is calculated on the basis of a welding current progression provided by the other welding power source, wherein
an ohmic portion of the compensation voltage (UKompR) is calculated by multiplying a present current level within a current profile (SP) of the welding current progression provided by the other welding power source by an ohmic coupling factor,
an inductive portion of the compensation voltage (UKompL) is calculated by multiplying a present change in current level within the current profile (SP) of the welding current progression provided by the other welding power source by an inductive coupling factor, and the compensation voltage (UKomp) is calculated by adding the ohmic portion of the compensation voltage (UKompR) and the inductive portion of the compensation voltage (UKompL);

subtracting the compensation voltage ($U_{Komp}$) from a measured voltage ($U_{Mess}$), measured by a voltage measurement unit of the welding power source, so as to determine a corrected measured voltage ($U'_{Mess}$); and regulating the welding current generated by the welding power source as a function of the corrected measured voltage ($U'_{Mess}$).

2. The method according to claim 1, wherein;
the compensation voltage ($U_{Komp}$) is calculated on the basis of stored coupling factors, and
the stored coupling factors include an ohmic coupling factor and at least one inductive coupling factor.

3. The method according to claim 2, wherein the compensation voltage ($U_{Komp}$) is read out from a data store of the welding power source in accordance with the welding current progression of the other welding power source.

4. The method according to claim 2, wherein the current profile (SP) of the welding current progression of the other welding power source is transmitted in a wireless or wired manner from the other welding power source to the computation unit of the welding power source.

5. The method according to claim 2, wherein the current profile (SP) of the welding current progression of the other welding power source comprises current levels and changes in current level along with associated time values.

6. The method according to claim 2, wherein the compensation voltage ($U_{Komp}$) calculated by a computation unit is continuously subtracted, by a compensation unit of the welding power source, from the measured voltage ($U_{Mess}$) measured by the voltage measurement unit of the welding power source so as to determine the corrected measured voltage ($U'_{Mess}$).

7. The method according to claim 1, wherein the calculation of the compensation voltage ($U_{Komp}$) and the determination of the corrected measured voltage ($U'_{Mess}$) are carried out in an analogue manner or digitally.

8. The method according to claim 1, wherein the welding current which is regulated by the regulation unit using the corrected measured voltage ($U'_{Mess}$) is supplied via a welding current line of the welding power source to a welding torch for welding the workpiece.

9. A welding power source for generating a welding current which can be supplied via a welding current line to a welding torch for welding at least one workpiece, wherein the welding power source comprises:
a computation unit configured and operable to calculate a compensation voltage ($U_{Komp}$) as a function of a welding current progression of another welding power source, and
a compensation unit configured and operable to subtract the compensation voltage ($U_{Komp}$) calculated by the computation unit from a measured voltage ($U_{Mess}$), measured by a voltage measurement unit of the welding power source, so as to determine a corrected measured voltage ($U'_{Mess}$), which is used by a regulation unit of the welding power source to regulate the welding current generated by the welding power source,
wherein the computation unit includes;
a first multiplier, configured and operable to multiply a present current level within the current profile by an ohmic coupling factor so as to calculate an ohmic portion of the compensation voltage ($U_{KompR}$),
a second multiplier, configured and operable to multiply a present change in current level within the current profile by an inductive coupling factor so as to calculate an inductive portion of the compensation voltage ($U_{KompL}$), and
an adder, configured and operable to add the ohmic portion of the compensation voltage ($U_{KompR}$) and the inductive portion of the compensation voltage ($U_{KompL}$) to calculate the compensation voltage ($U_{Komp}$).

10. The welding power source according to claim 9, wherein:
the computation unit of the welding power source is configured and operable to calculate the compensation voltage ($U_{Komp}$) on the basis of coupling factors, which are stored in a data store of the welding power source or received via an interface from a data store of another welding power source or from a database, and
the coupling factors include an ohmic coupling factor and at least one inductive coupling factor.

11. The welding power source according to claim 9, wherein the current profile of the welding current of the other welding power source comprises current levels and changes in current level along with associated time values.

12. The welding power source according to claim 9, wherein a current profile of the welding current of the other welding power source is received from the other welding power source via a wireless or wired interface of the welding power source.

13. A welding system comprising at least two welding power sources which are jointly operated simultaneously for welding one or more workpieces, wherein each welding power source is provided for generating a welding current which can be supplied via a welding current line to a welding torch for welding the at least one workpiece, wherein each welding power source comprises:
a computation unit configured and operable for calculating a compensation voltage (UKomp) as a function of a welding current progression of another welding power source, and
a compensation unit configured and operable for subtracting the compensation voltage (UKomp) calculated by the computation unit from a measured voltage (UMess), measured by a voltage measurement unit of the welding power source, so as to determine a corrected measured voltage (U'Mess), which is used by a regulation unit of the welding power source to regulate the welding current generated by the welding power source,
wherein the computation unit includes;
a first multiplier, configured and operable to multiply a present current level within the current profile by an ohmic coupling factor so as to calculate an ohmic portion of the compensation voltage ($U_{KompR}$),
a second multiplier, configured and operable to multiply a present change in current level within the current profile by an inductive coupling factor so as to calculate an inductive portion of the compensation voltage ($U_{KompL}$), and
an adder, configured and operable to add the ohmic portion of the compensation voltage ($U_{KompR}$) and the inductive portion of the compensation voltage ($U_{KompL}$) to calculate the compensation voltage ($U_{Komp}$).

14. The welding power source according to claim 10, wherein the current profile of the welding current of the other welding power source comprises current levels and changes in current level along with associated time values.

\* \* \* \* \*